(12) United States Patent  
Sha et al.

(10) Patent No.: US 11,864,212 B2  
(45) Date of Patent: Jan. 2, 2024

(54) INFORMATION TRANSMISSION FOR PRE-CONFIGURING DEDICATED RESOURCES IN IDLE MODE

(71) Applicant: ZTE Corporation, Guangdong (CN)

(72) Inventors: Xiubin Sha, Guangdong (CN); Bo Dai, Guangdong (CN); Ting Lu, Guangdong (CN); Xu Liu, Guangdong (CN); Kun Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 197 days.

(21) Appl. No.: 17/305,565

(22) Filed: Jul. 9, 2021

(65) Prior Publication Data

US 2021/0345344 A1  Nov. 4, 2021

Related U.S. Application Data

(63) Continuation of application No. PCT/CN2019/071450, filed on Jan. 11, 2019.

(51) Int. Cl.
*H04W 72/53* (2023.01)
*H04W 24/08* (2009.01)
(Continued)

(52) U.S. Cl.
CPC ........... *H04W 72/53* (2023.01); *H04W 24/08* (2013.01); *H04W 68/005* (2013.01);
(Continued)

(58) Field of Classification Search
CPC ... H04W 72/53; H04W 24/08; H04W 68/005; H04W 72/0446; H04W 72/1263; H04W 74/02; H04W 74/0841
See application file for complete search history.

(56) References Cited

U.S. PATENT DOCUMENTS

2013/0039287 A1* 2/2013 Rayavarapu .......... H04W 76/28  
370/329  
2016/0205661 A1* 7/2016 Ryu ...................... H04W 68/02  
455/458  
(Continued)

FOREIGN PATENT DOCUMENTS

WO  2017147550 A1  8/2017  
WO  2018031327 A1  2/2018  
WO  2018097947 A2  5/2018

OTHER PUBLICATIONS

European Search Report for EP Patent Application No. 19850063.9, dated Dec. 20, 2021, 6 pages.

(Continued)

*Primary Examiner* — Chae S Lee  
(74) *Attorney, Agent, or Firm* — Perkins Coie LLP

(57) ABSTRACT

Methods, systems, and devices related to related to digital wireless communication, and more specifically, to techniques related to transmitting pre-configured dedicates resources for data transmission. In one exemplary aspect, a method for wireless communication includes transmitting a pre-configured transmission resource information indicating a time domain location to a core network node. The method also includes receiving transmission data from the core network node at the time domain location indicated in the pre-configured transmission resource information. In another exemplary aspect, a method for wireless communication includes connecting a communication node to a core network node. The method also includes receiving transmission data including a pre-configured transmission resource information at a time domain location from the core network node.

20 Claims, 26 Drawing Sheets

(51) Int. Cl.
    *H04W 68/00*     (2009.01)
    *H04W 72/0446*     (2023.01)
    *H04W 72/1263*     (2023.01)
    *H04W 74/02*     (2009.01)
    *H04W 74/08*     (2009.01)

(52) U.S. Cl.
    CPC ... *H04W 72/0446* (2013.01); *H04W 72/1263* (2013.01); *H04W 74/02* (2013.01); *H04W 74/0841* (2013.01)

(56) References Cited

U.S. PATENT DOCUMENTS

| | | | |
|---|---|---|---|
| 2019/0289570 A1* | 9/2019 | Kim | H04W 68/005 |
| 2020/0037285 A1* | 1/2020 | Sivavakeesar | H04W 76/19 |
| 2020/0137761 A1* | 4/2020 | Shih | H04W 76/25 |
| 2020/0374780 A1* | 11/2020 | Shan | H04W 28/06 |

OTHER PUBLICATIONS

Huawei, et al., "Further topics for transmission in preconfigured UL resources," 3GPP TSG RAN WG1 Meeting #95, R1-1813762, Spokane, USA, Nov. 12-16, 2018, 14 pages.

Intel Corporation, "Uplink URLLC Transmission without Grant," 3GPP TSG RAN WG1 NR Ad-Hoc Meeting, R1-1701206, Spokane, USA, Jan. 16-20, 2017, 10 pages.

International Search Report for PCT/CN2019/071450, filed Jan. 11, 2019, dated Sep. 24, 2019, 11 pages.

Intellectual Property Office of Vietnam, Office Action for Vietnamese Patent Application No. 1-2021-04874, dated Aug. 14, 2023, 3 pages with unofficial translation.

* cited by examiner

INFORMATION TRANSMISSION FOR PRE-CONFIGURING DEDICATED RESOURCES IN IDLE MODE

CROSS-REFERENCE TO RELATED APPLICATIONS

This application is a continuation of International Patent Application No. PCT/CN2019/071450, filed on Jan. 11, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related pre-configuring dedicated transmission resources.

In one exemplary aspect, a method for wireless communication is disclosed. The method includes transmitting a pre-configured transmission resource information indicating a time domain location to a core network node. The method also includes receiving transmission data from the core network node near the time domain location indicated in the pre-configured transmission resource information In another exemplary aspect, a method for wireless communication is disclosed. The method includes establishing a terminal-specific connection with a core network node before or at a time domain location of the pre-configured transmission resource. The method also includes receiving transmission data from the core network node.

In another exemplary aspect, a method for wireless communication is disclosed. The method includes receiving a paging message from a core network node within a predetermined time duration before the pre-configured transmission resource information. The method also includes forwarding the paging message to the terminal, wherein the paging message includes a time delay. The method also includes monitoring transmission data over a pre-configured transmission resource from the terminal to establish a terminal-specific connection from the communication node to the core network node.

In another exemplary aspect, a method for wireless communication is disclosed. The method includes transmitting a common search space (CSS) transmission corresponding to a pre-configured transmission resource to a terminal, wherein a system information block (SIB) of the transmission includes a pre-configured transmission resource common search space configuration information. The method also includes transmitting a message including a pre-configured transmission resource CSS index to the terminal.

In another exemplary aspect, a method for wireless communication is disclosed. The method includes transmitting a pre-configured transmission resource allocation transmission that includes a terminal-specific pre-configured transmission resource search space configuration information to a terminal. The method also includes receiving a data transmission over a pre-configured transmission resource location at the time domain location for the pre-configured transmission resource search space configuration information from the terminal. The method also includes scheduling a terminal-specific search space and a terminal-specific identifier within a timer or a predetermined time duration, wherein the terminal is configured to monitor the terminal-specific pre-configured transmission search space within the timer or the predetermined time duration.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Figure 1:
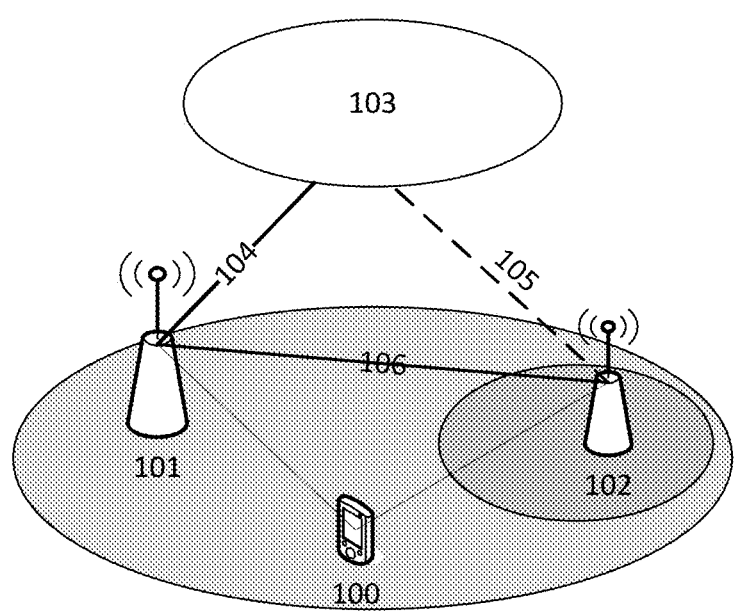
FIG. 1 shows an exemplary schematic diagram of a system architecture for Dual Connectivity (DC).

As NR emerges in the wireless domain, UEs will be capable of supporting both protocols at the same time. FIG. 1 shows an exemplary schematic diagram of a system architecture for Dual Connectivity (DC). The current base station (referred to as the first network element 81) in the core network 103 may select a suitable base station for the UE 80 to function as the second network element 82. For example, the suitable based station can be selected by comparing the channel quality of the base station with a predetermined threshold. Both base stations can provide radio resources to the UE 80 for data transmission on the user plane. On the wired interface side, the first network element 81 and the core network 103 establish a control plane interface 104 for the UE 80. The second network element 82 and the core network 103 may establish a user plane interface 105 for the UE 80. An interface 106 (e.g., Xn interface) inter-connects the two network elements. On the wireless interface side, the first and the second network elements (81 and 82) may provide radio resources using the same or different Radio Access Technologies (RATs). Each of the network element can schedule transmissions with the UE 80 independently. The network element that has a control plane connection to the core network is referred to as the master node (e.g., the first network element 81), and the network element that has only a user plane connection with the core network is referred to as the secondary node (e.g., the second network element 82). In some cases, the UE 80 can be connected to more than two nodes, with one node acting as the primary note and the remaining acting as the secondary nodes.

In some embodiments, a UE can support a LTE-NR dual connection (DC). For example, one of the typical LTE-NR dual connectivity architectures can be set up as follows: the master node is an LTE RAN node (e.g., eNB) and the secondary node is an NR RAN node (e.g., gNB). The eNB and the gNB are simultaneously connected the Evolved Packet Core (EPC) network (e.g., LTE core network). The architecture shown in FIG. 1 can also be modified to include various master/secondary node configurations. For example, a NR RAN node can be the master node and the LTE RAN node can be the secondary node. In such case, the core network for the master NR RAN node is a Next Generation Converged Network (NG-CN).

UE capabilities for the LTE protocol and the NR protocol in LTE-NR DC include two parts: common capabilities of the UE that are applicable to both LTE and NR protocols for single connectivity scenarios, and band combination capabilities of the UE that are relevant for dual connectivity scenarios. When the UE has multiple simultaneous connections with network nodes, the frequency bands used for different network nodes must cooperate with each other regardless of the RAT type(s) used. Here, the term "cooperate" means that the UE can operate in the frequency bands without any conflicts or substantial interference—that is, the frequency bands can co-exist. For example, the 3rd Generation Partnership Project (3GPP) Standards specify a set of band combinations that can cooperate with each other. If frequency band 1 and frequency band 2 are not specified as a valid band combination, the UE cannot use frequency band 1 in communication with node 1 and frequency band 2 in communication with node 2 and the same time.

This patent document describes techniques that can be implemented to transmit downlink information based on pre-configured dedicated resources for data transmission.

In machine to machine (M2M) communication systems, a terminal (or "User Equipment (UE)") energy power may be consumed during an establishment of a radio resource control (RRC) connection process and data transmission and reception in a RRC connected state. For a NarrowBand-Internet of Things (NB-IoT) small main bearing for data transmission, a terminal may be in an RRC connected state for a short time, and the primary power consumption of the terminal may be during a connection establishment procedure (e.g., a physical random-access channel (PRACH) procedure). Particularly, in an early data transmission (EDT), small data packets may be transmitted by the PRACH procedure, and a terminal transmitting small data packets may not have to enter an RRC connected state. Accordingly, in some events, power consumption of a terminal transmitting small data packets may primarily be consumed during the PRACH procedure.

In many cases, a PRACH process in a RRC connection establishment process may be based on PRACH resources, where the process may be divided into four steps. A first step may include a first message from a terminal ("UE") to a base station or communication node (or "eNodeB"), which may be represented by: Msg1: UE→eNodeB. A second step may include a random-access response (RAR) message from the base station to the terminal, which may be represented by: Msg2: eNodeB→UE. A third step may include a first RRC message from the terminal to the base station, which may be represented by: Msg3: UE→eNodeB. A fourth step may include a second RRC message from the base station to the terminal, which may be represented by: Msg4: eNodeB→UE.

The third step (Msg3) may include a UE identifier that identifies a terminal, and the fourth step (Msg4) may complete a contention resolution based on the UE identifier, and the PRACH process may end. In a non-EDT scheme, after the contention resolution is complete, the terminal may enter a RRC connected state and start a terminal-specific data transmission. In an EDT scheme, the third step (msg3) may carry/include uplink data, and the fourth step (Msg4) may include the downlink data. A description of contention completion may indicate that the uplink and/or downlink data has been successfully transmitted to a destination. Upon this completion, the terminal may transition into a RRC idle state.

If a terminal is configured with a dedicated uplink resource in an RRC idle mode, such as a pre-configured uplink resource (PUR), the data transmission/reception may be performed on the PUR, and contention resolution (UE identification) may be completed based on a pre-configured resource transmitted in the second step (Msg2). This may shorten the PRACH process and improve efficiency (including energy efficiency) of small data transmission.

When pre-configuring an RRC idle mode dedicated resources for a terminal, the following issues may be considered: strategy considerations for downlink data transmission based on pre-configured dedicated resources, a PUR PDCCH common search space (CSS) configuration method; a PUR UE-specific PDCCH search space (PUR-USS) configuration method, coupling processing method for paging and pre-configured dedicated resources, and PUR dedicated resource configuration method with multi-service pattern overlay.

Example Embodiment 1

FIGS. 2A-E illustrates an exemplary signaling process of downlink data transmission based on pre-configured dedicated resources. Pre-configured dedicated resources (or "pre-configured uplink resources (PUR) may include a dedicated resource location. A base station 230 (or "eNB") may notify a core network node (or "MME") 240 of a PUR dedicated resource time (or "time domain location") during a PUR resource configuration. In response, the MME 240 may send a paging message that may include downlink data to the eNB 230 at the PUR dedicate resource time.

Figure 2A:
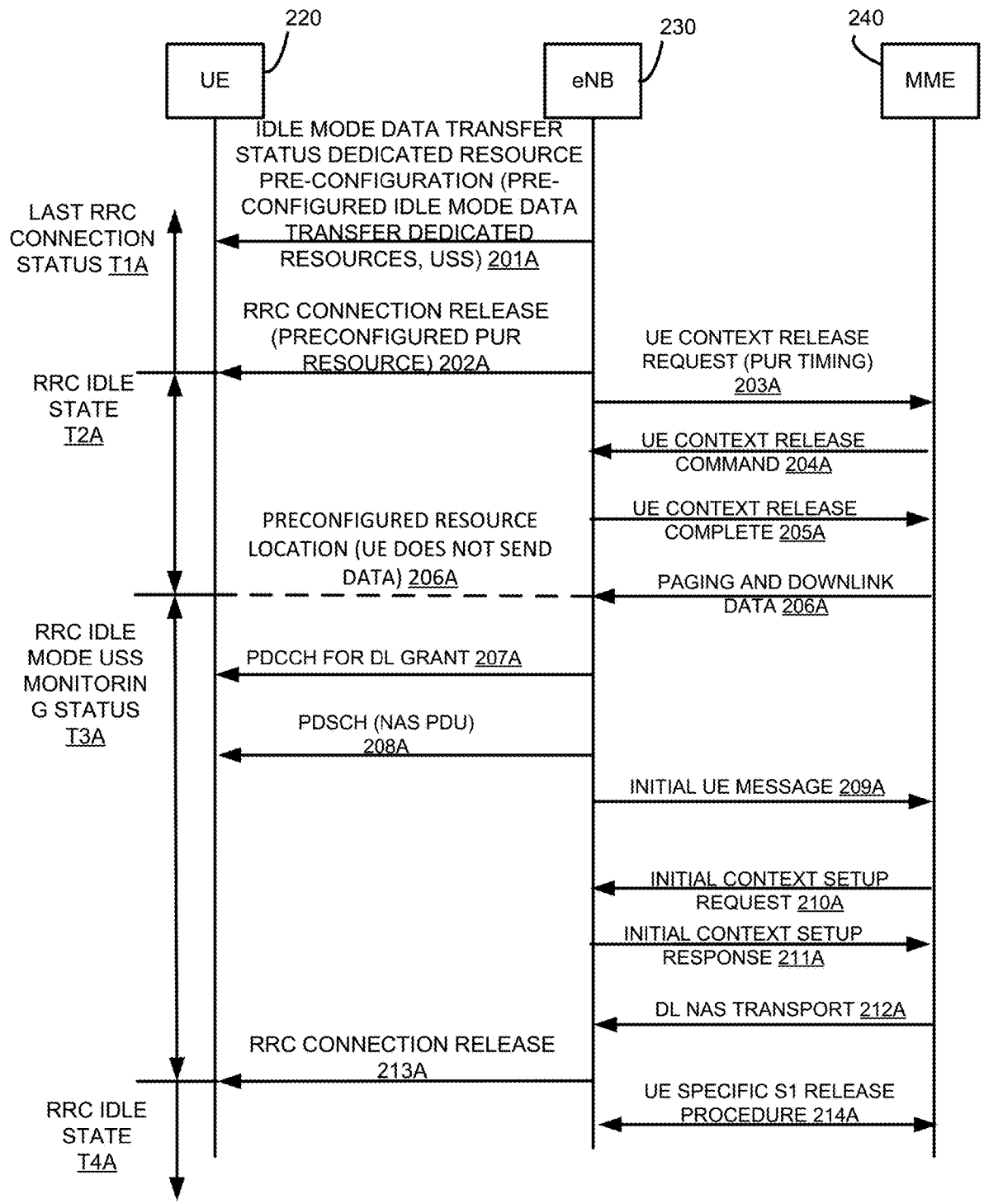
FIGS. 2A-E illustrates an exemplary signaling process of downlink data transmission based on pre-configured dedicated resources

In FIG. 2A, step 201A illustrates that the eNB 230 may transmit an idle mode data transfer status dedicated pre-configuration message to the terminal 220. The message may include pre-configured idle mode data transfer dedicated resources and a terminal-specific PDCCH search space.

Step 202A: the eNB 230 may transmit a RRC connection release message to the UE 220. This RRC connection release message may include a pre-configured PUR resource). The UE 220 may transition from the last RRC connection status T1A to the RRC idle state T2A upon receiving the RRC connection release message.

Step 203A: the eNB 230 may transmit a message including a time domain location of the dedicated resource (or "PUR timing") is notified to the MME 240 using UE-specific signaling. The UE specific signaling may be a UE CONTEXT RELEASE REQUEST or another dedicated message.

Step 204A: The MME 240 may transmit a UE CONTEXT RELEASE COMMAND to the eNB 230 based on receiving the UE CONTEXT RELEASE REQUEST 203A.

Step 205A: The eNB 230 may transmit a UE CONTEXT RELEASE COMPLETE message to the MME 240 indicating that the UE context release request was completed.

Step 206A: The MME 240 may transmit paging and/or downlink data to the eNB. When the core network 240 has downlink data to be transmitted, one of the following information may be sent to the eNB 230 in the time domain location of the PUR: Paging, Paging and data, data and non-access stratum (NAS) identifier of the UE. The NAS identifier of the UE may be an System Architecture Evolution (SAE) Temporary Mobile Subscriber Identity (STMSI) or an identifier of a similar identifiable UE. The paging and/or downlink data may be transmitted at the pre-configured resource time domain location, where the UE 220 may not transmit any data. At the preconfigured resource time domain location, the UE 220 may switch from an RRC idle state T2A to an RRC idle mode USS monitoring status T3A.

Step 207A: Upon receipt of information transmitted from the MME 240, a downlink PDCCH search space corresponding to a pre-configured dedicated resource may use a dedicated Radio Network Temporary Identifier (RTNI) to perform downlink resource scheduling and/or downlink data transmission to the UE 220. The eNB 230 may transmit downlink data to the UE 220 using a physical downlink control channel (PDCCH) for downlink (DL) grant.

Step 208A: The eNB 230 may transmit a physical downlink shared channel (PDSCH) message to the UE 220. The PDSCH message may include a NAS PDU.

Step 209A: The eNB may transmit an initial UE message to the MME 240. After the eNB 230 receives the information sent by the core network 240, if the UE 220 has a corresponding pre-configured dedicated resource in the eNB 230, the eNB 230 triggers the connection establishment of a UE Specific type of the eNB 230 to the MME 240.

Step 210A: The MME 240 may transmit an initial context setup request to the eNB 230.

Step 211A: The eNB 230 may transmit an initial context setup response to the MME 240. This message may be transmitted based on receipt of the initial context setup request 210A.

Step 212A: The MME 240 may transmit a downlink NAS transport message to the eNB 230.

Step 213A: The eNB 230 may transmit an RRC connection release message to the UE 220. The RRC connection release message 213 may request the UE 220 to switch from a RRC idle mode USS monitoring status T3A to a RRC idle mode T4A.

Step 214A: The eNB 230 and MME 240 may communicate via a UE-specific S1 release procedure.

Figure 2B:
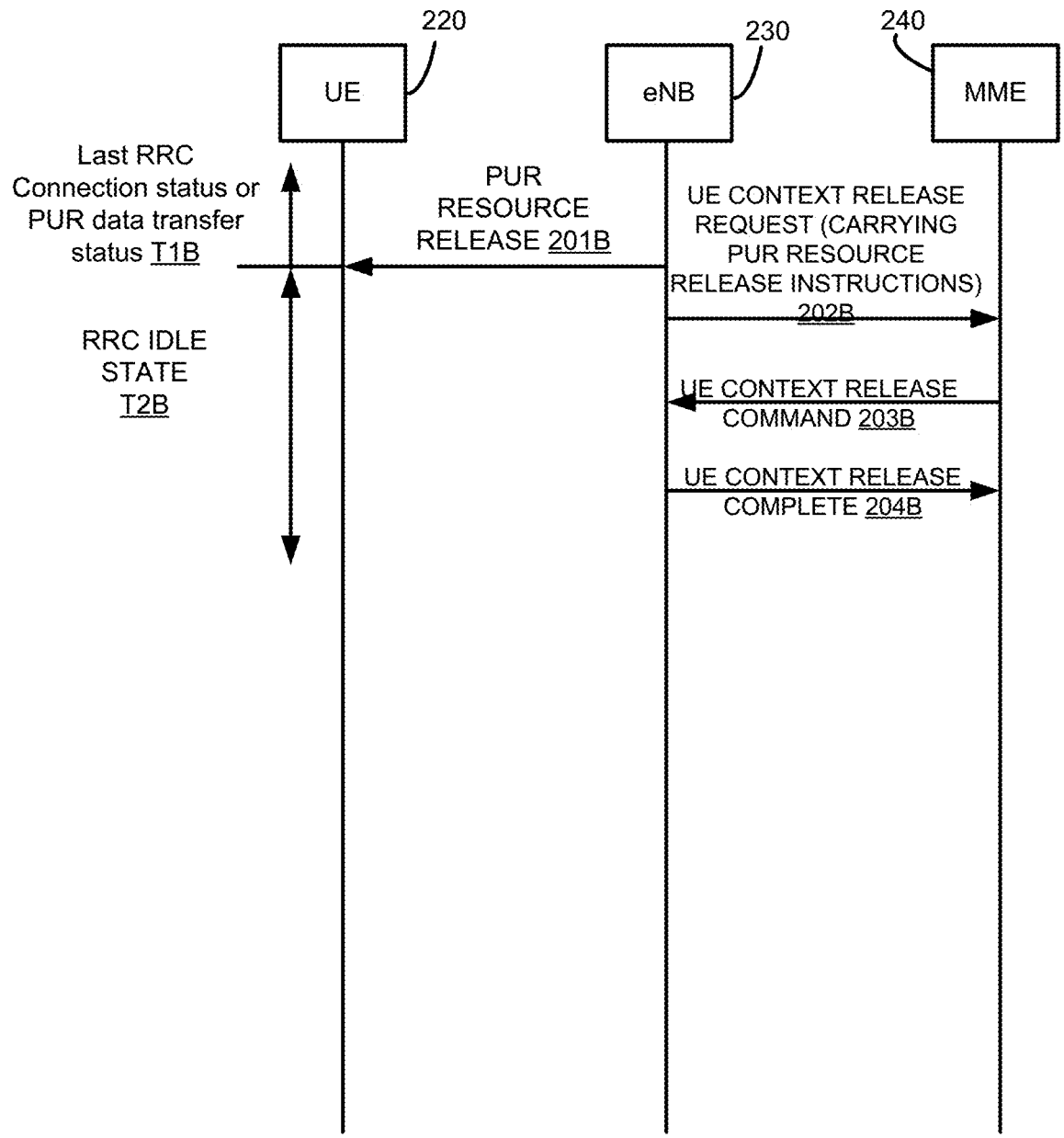

FIG. 2B illustrates a PUR release indication procedure. In Step 201B, the eNB may transmit a PUR resource release message to the UE 220 indicating the UE 220 to release a PUR resource. The UE 220 may switch from a last RRC connection status or a PUR data transfer status T1B to an RRC idle state T2B based on receipt of the PUR resource release message 201B.

Step 202B: After the eNB 230 sends the PUR resource release message 201B to the UE 220, the eNB may transmit a PUR-specific resource release message to the MME 240. The PUR-specific resource release message 202B may include PUR resource release instructions instructing the MME to release the PUR resource. The PUR-specific resource release message 202B may be transmitted using UE-specific signaling, such as a UE CONTEXT RELEASE REQUEST message or other dedicated message sent to the MME 240.

Step 203B: The MME 240 may transmit a UE context release command to the eNB 230.

Step 204B: The eNB 230 may transmit a UE context release complete message to the MME 240 indicating that the release procedure is complete.

Figure 2C:
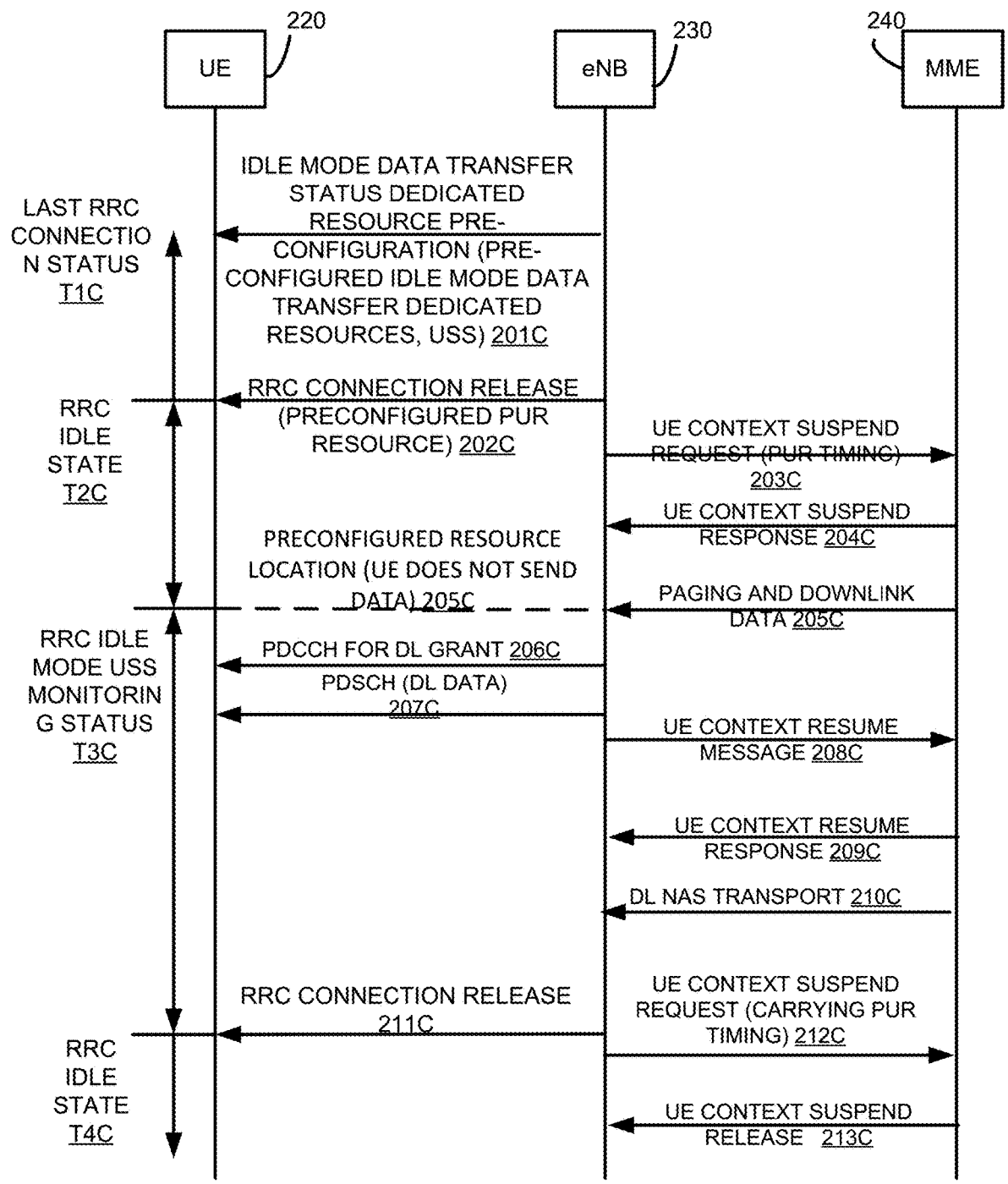

FIG. 2C illustrates a user plane (UP) PUR release indication procedure. In step 201C, the eNB 230 may transmit an idle mode data transfer status dedicated pre-configuration message to the terminal 220. The message may include pre-configured idle mode data transfer dedicated resources and a terminal-specific PDCCH search space.

Step 202C: The eNB 230 may transmit a RRC connection release message to the UE 220. The UE 220 may switch from the last RRC connection status T1C to the RRC idle state T2C based on receiving the RRC connection release message 202C.

Step 203C: The eNB 230 may transmit a message to a MME 240 that includes the time domain location of the dedicated PUR resource. After the eNB 230 pre-configures the PUR dedicated resource to the UE 220, the time domain location of the dedicated resource may be sent to the MME 240 by using the UE specific signaling. The UE Specific signaling may be a UE CONTEXT SUSPEND REQUEST message or another dedicated message sent to the MME 240.

Step 204C: The MME 240 may transmit a UE context suspend response to the eNB in response to receiving the UE context suspend request 203C from the eNB 230.

Step 205C: The MME 240 may transmit paging and/or downlink data to the eNB 230. When the core network 240 has downlink data to be transmitted, one of the following information may be sent to the eNB 230 in the time domain location of the PUR: Paging information, Paging information and data, data and the NAS identifier of the UE 220. The NAS identifier of the UE 220 may be an STMSI or an identifier of a similar identifiable UE. The paging and downlink data 205C may be transmitted at the preconfigured resource location, where UE 220 may not need to transmit uplink data. The UE 220 may transition from the RRC idle state T2C to a RRC idle mode USS monitoring status T3C at the preconfigured resource location.

Step 206C: The eNB 230 may transmit a PDCCH for DL grant to the UE 220. When the eNB 230 receives the paging and/or downlink data sent by the core network, a downlink PDCCH search space corresponding to the pre-configured dedicated resource may use a dedicated RNTI to perform downlink resource scheduling and/or downlink data transmission to the UE 220.

Step 207C: The eNB 230 may transmit a PDSCH message to the UE 220 that may include downlink (DL) data.

Step 208C: After the eNB 230 receives the information sent by the core network 240, if the UE 220 has a corresponding pre-configured dedicated resource in the eNB 230, the eNB 230 may trigger the connection establishment of the UE Specific type of the eNB 230 to the MME 240. The eNB 230 may transmit a UE context resume message or another similar message to the MME 240.

Step 209C: The eNB 230 may transmit a UE context resume response to the MME 240. This message may be transmitted based on receipt of the UE context resume request 208C.

Step 210C: The MME 240 may transmit a downlink NAS transport message to the eNB 230.

Step 211C: The eNB 230 may transmit a RRC connection release message to the UE 220. The UE 220 may transition from an RRC idle mode USS monitoring status T3C to a RRC idle state T4C based on the UE 220 receiving the RRC connection release 211C.

Step 212C: After the eNB 230 sends the pre-configured PUR-specific resource release indication to the MME 240, the eNB 230 may send the pre-configured PUR-specific resource release indication to the MME 240 by using the UE specific signaling. The UE Specific signaling may be a UE CONTEXT SUSPEND REQUEST message or another dedicated message sent to the MME 240.

Step 213C: The MME 240 may transmit a UE context suspend release message to the eNB 230 based on receiving the UE context suspend request 212C from the eNB 230.

Figure 2D:
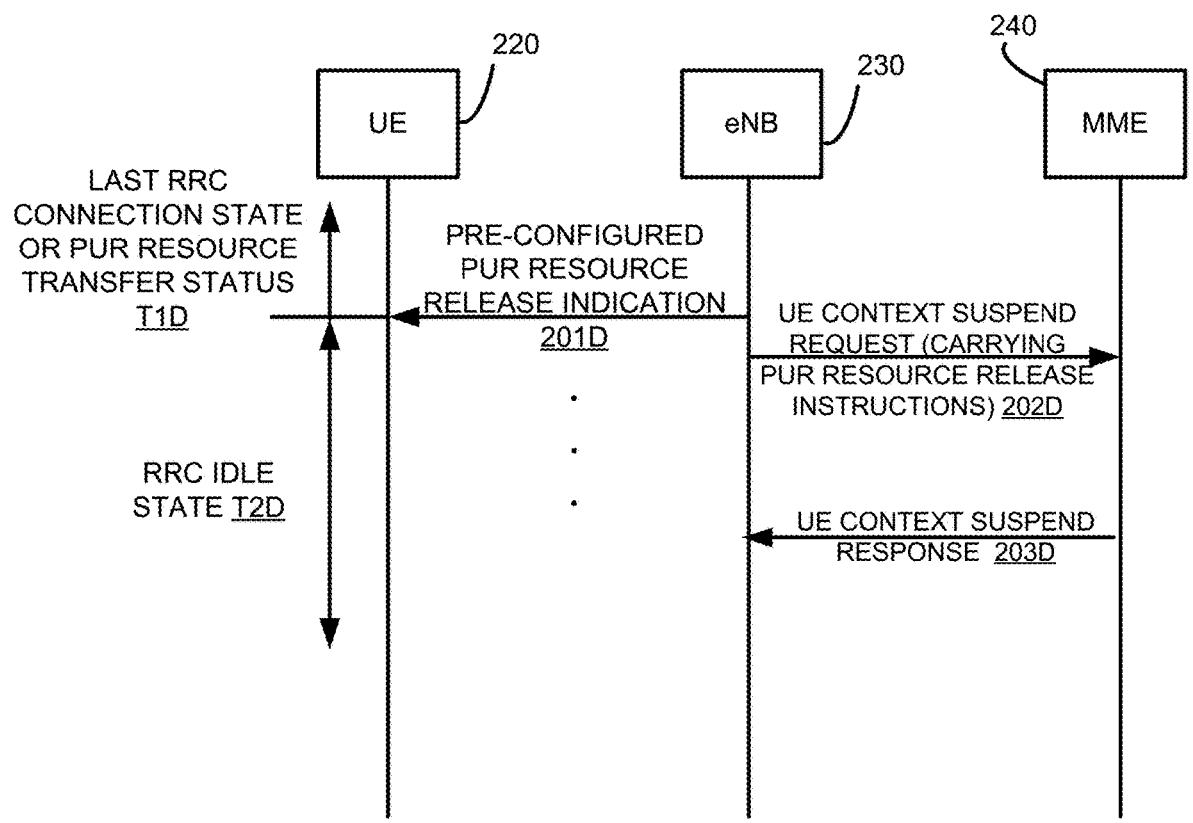

FIG. 2D illustrates a user plane PUR release indication. In step 201D, the eNB 230 may transmit pre-configured PUR resource release indication to the UE 220. This indication 201D may request the UE 220 to transition from a last RRC connection state or PUR resource transfer status T1D to an RRC idle state T2D.

Step 202D: After the eNB 230 sends the pre-configured PUR-specific resource release indication 201D to the UE 220, the eNB 230 may send the pre-configured PUR-specific resource release indication to the MME 240 by using the UE specific signaling. The UE Specific signaling may be a UE CONTEXT SUSPEND REQUEST message or another dedicated message sent to the MME 240. The UE context suspend request message may include PUR resource release instructions.

Step 203D: The MME 240 may transmit a UE context suspend responds to the eNB 230 based on receiving the UE context suspend request from the eNB 230.

Figure 2E:
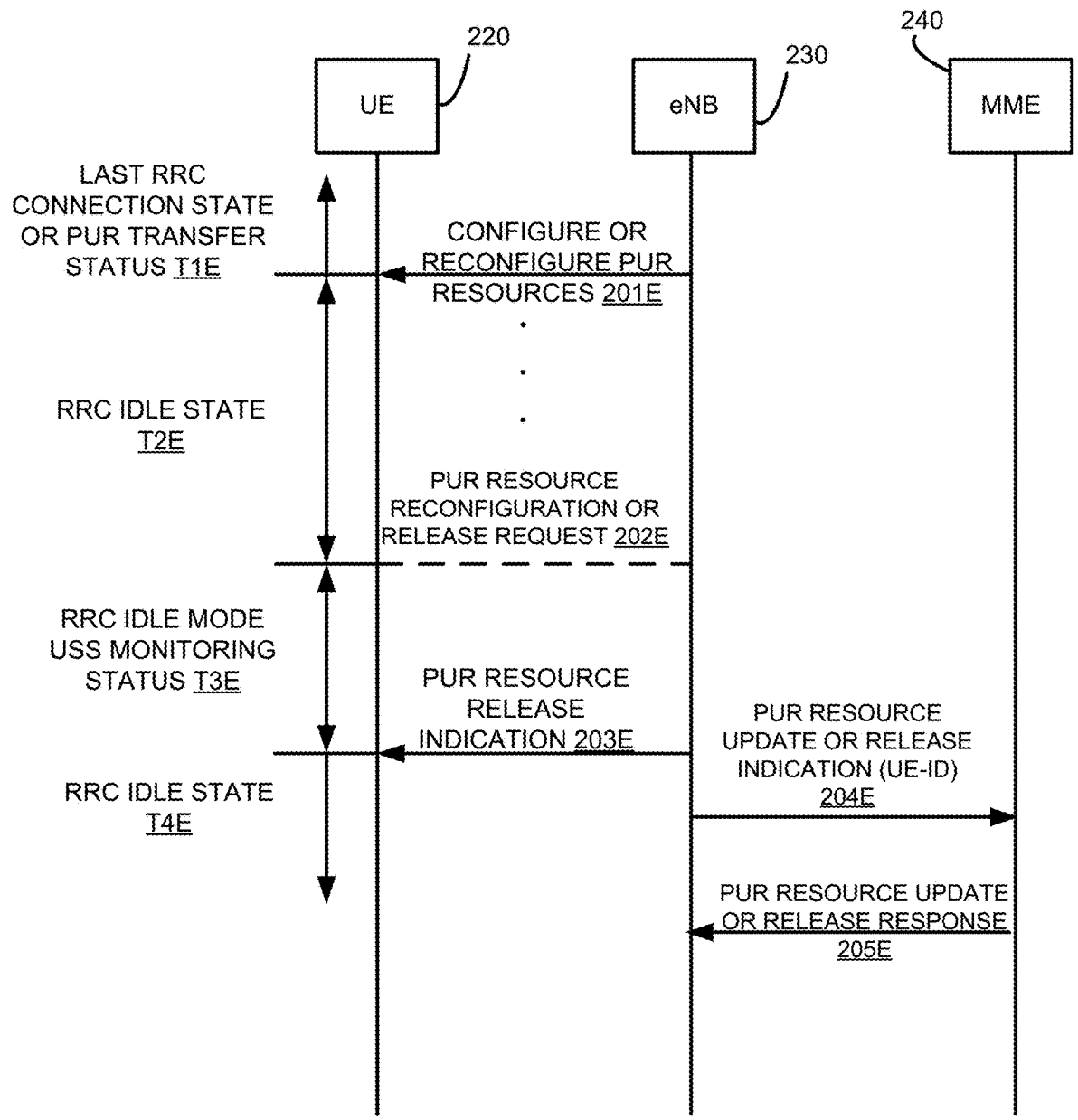

FIG. 2E illustrates a dedicated signaling release for a PUR resource. In Step 201E, the eNB 230 may transmit a message indicating a request to configure or reconfigure PUR resources to the UE 220. The UE 220 may transition from the last RRC connection state or PUR transfer status T1E to an RRC idle state T2E based on receipt of message 201E.

Step 202E: A PUR resource reconfiguration or release request may transition the UE 220 from the RRC idle state T2E to an RRC idle mode USS monitoring status T3E.

Step 203E: The eNB 230 mat transmit a PUR resource reconfiguration or release indication to the UE, where the UE 220 may transition from the RRC idle mode USS monitoring status T3E to the RRC idle state T4E.

Step 204E: When the dedicated PUR resource is updated or released, the PUR resource time domain location update or the PUR resource release indication is notified to the MME 240. In an embodiment, there is no terminal-specific connection between the eNB 230 and the MME 240, and a UE identifier and the reconfiguration/release indication may be included in a message.

After the eNB 230 sends the pre-configured PUR dedicated resource time domain reconfiguration or the PUR resource release indication to the UE 220, the eNB 230 may send the time domain location reconfiguration information or the PUR resource release indication of the preconfigured PUR dedicated resource to the MME 240 by using the UE specific signaling. The UE specific signaling may carry at least one of the following messages: a UE NAS identifier (such as S-TMSI), and the time domain location information or the PUR resource release indication of the pre-configured PUR dedicated resource.

Step 205E: After receiving the PUR dedicated resource time domain reconfiguration or PUR resource release indication, the MME 240 may transmit a PUR resource time domain location update or PUR resource release and may send a response or acknowledgement message to the eNB 230. The reconfiguration or release process of the PUR resource may end upon transmission of the PUR resource update or release response 205E. The RRC idle mode USS monitoring state may include to a PDCCH search space corresponding to an uplink dedicated resource of the idle mode, and the UE may monitor the PDCCH search space corresponding to the uplink dedicated resource at the resource location.

Example Embodiment 2

Figure 3A:
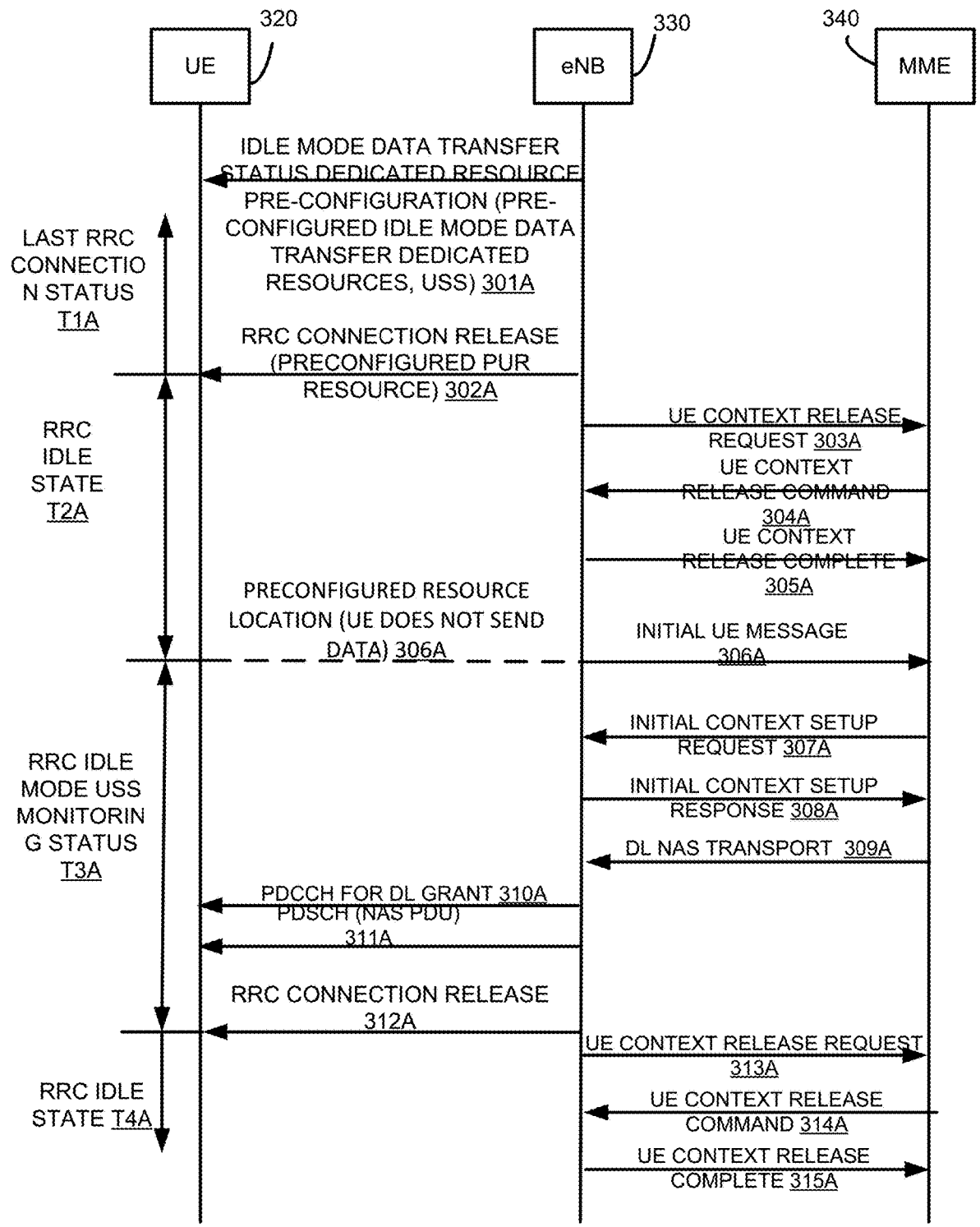
FIGS. 3A-D illustrate examples of data transmission based on pre-configured dedicated resources.

FIGS. 3A-D illustrate examples of data transmission based on pre-configured dedicated resources. In FIG. 3A, step 301A illustrates that the eNB 330 may transmit an idle mode data transfer status dedicated pre-configuration message to the terminal 320. The message may include pre-configured idle mode data transfer dedicated resources and a terminal-specific PDCCH search space.

Step 302A: the eNB 330 may transmit a RRC connection release message to the UE 320. This RRC connection release message may include a pre-configured PUR resource. The UE 320 may transition from the last RRC connection status T1A to the RRC idle state T2A upon receiving the RRC connection release message.

Step 303A: the eNB 330 may transmit a message to the MME 340 using UE-specific signaling. The UE specific signaling may be a UE CONTEXT RELEASE REQUEST or another dedicated message.

Step 304A: The MME 340 may transmit a UE CONTEXT RELEASE COMMAND to the eNB 330 based on receiving the UE CONTEXT RELEASE REQUEST 303A.

Step 305A: The eNB 330 may transmit a UE CONTEXT RELEASE COMPLETE message to the MME 340 indicating that the UE context release request was completed.

Step 306A: The eNB 330 may transmit an initial UE message before or at a time domain location of the dedicated resource (or "PUR timing") to the MME 340. After the eNB 330 receives the information sent by the core network 340, if the UE 320 has a corresponding pre-configured dedicated resource in the eNB 330, the eNB 330 may trigger the connection establishment of a UE Specific type of the eNB 330 to the MME 340. The UE 220 mat transition from a RRC idle state T2A to a RRC idle mode USS monitoring status T3A at the preconfigured resource location.

The eNB 330 may trigger the establishment of a connection to the MME 340 via an interface (e.g., a S1 interface). Establishing such a connection to the MME 340 may not depend on the receipt of uplink data resources at the PUR timing (preconfigured time domain location). Upon establishing an interface, such as a S1 interface, the MME 340 may transmit downlink data to the eNB 330. The eNB 330 may utilize downlink resource scheduling for the downlink PDCCH search space and resources RNTI PUR to transmit downlink data to the UE 320.

Step 307A: The MME 340 may transmit an initial context setup request to the eNB 330.

Step 308A: The eNB 330 may transmit an initial context setup response to the MME 340. This message may be transmitted based on receipt of the initial context setup request 307A.

Step 309A: The MME 340 may transmit a downlink NAS transport message to the eNB 330.

Step 310A: The eNB 330 may transmit an PDCCH message for a downlink (DL) grant to the terminal.

Step 311A: The eNB 330 may transmit an PDSCH message to the UE 320 that includes a NAS PDU.

Step 312A: The eNB 330 may transmit an RRC connection message to the UE 320. The UE 320 may transition from a RRC idle mode USS monitoring status T3A to a RRC idle state T4A based on receiving the RRC connection message 312A.

Step 313A: the eNB 330 may transmit a message to the MME 340 using UE-specific signaling. The UE specific signaling may be a UE CONTEXT RELEASE REQUEST or another dedicated message.

Step 314A: The MME 340 may transmit a UE CONTEXT RELEASE COMMAND to the eNB 330 based on receiving the UE CONTEXT RELEASE REQUEST 313A.

Step 315A: The eNB 330 may transmit a UE CONTEXT RELEASE COMPLETE message to the MME 340 indicating that the UE context release request was completed.

Figure 3B:
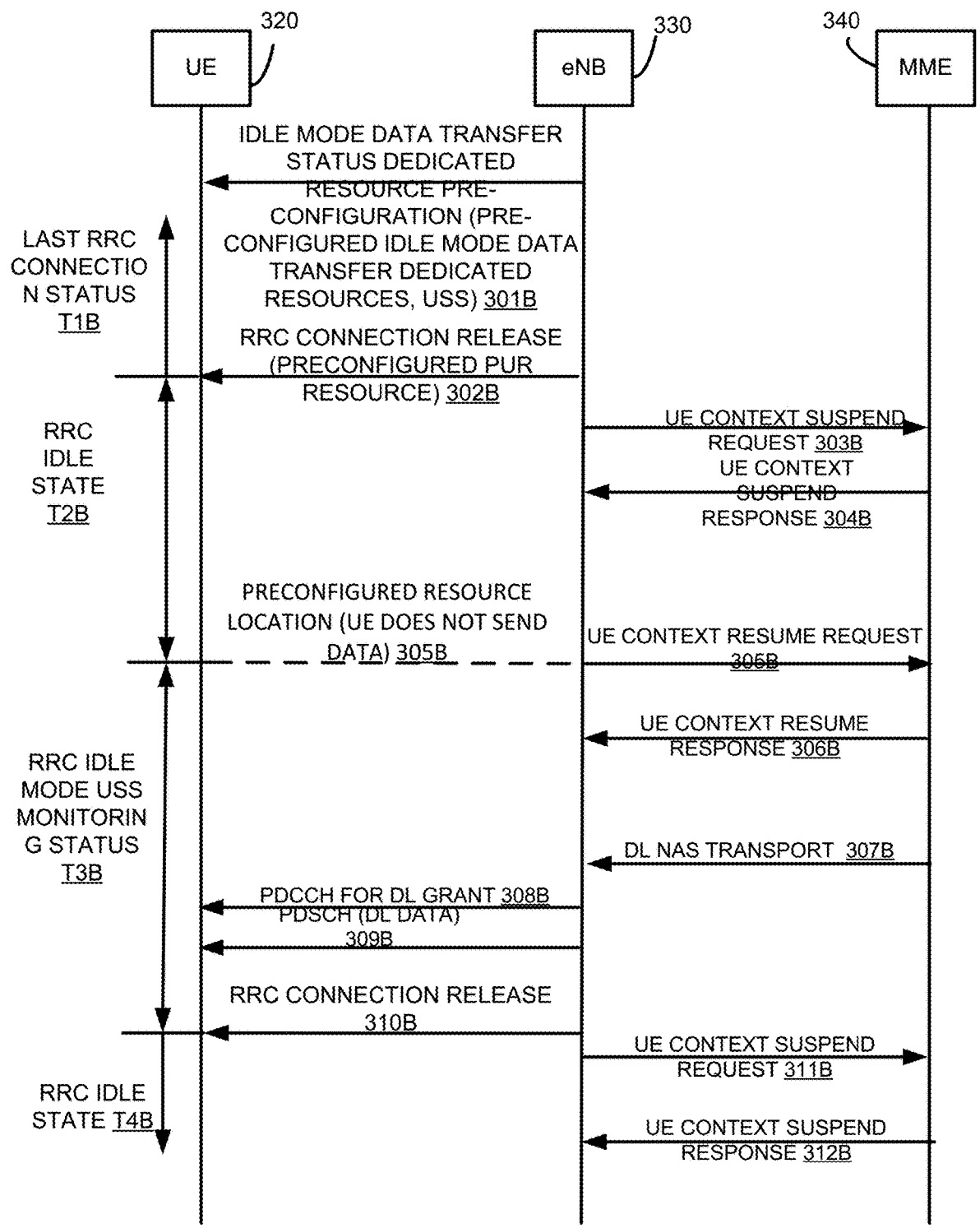

FIG. 3B illustrates pre-configured data transfer for dedicated resources in idle mode. In FIG. 3B, step 301B illustrates that the eNB 330 may transmit an idle mode data transfer status dedicated pre-configuration message to the terminal 320. The message may include pre-configured idle mode data transfer dedicated resources and a terminal-specific PDCCH search space.

Step 302B: the eNB 330 may transmit a RRC connection release message to the UE 320. This RRC connection release message may include a pre-configured PUR resource. The UE 320 may transition from the last RRC connection status T1B to the RRC idle state T2B upon receiving the RRC connection release message.

Step 303B: the eNB 330 may transmit a message to the MME 340 using UE-specific signaling. The UE specific signaling may be a UE CONTEXT SUSPEND REQUEST or another dedicated message.

Step 304B: The MME 340 may transmit a UE CONTEXT SUSPEND RESPONSE to the eNB 330.

Step 305B: the eNB 330 may transmit a UE CONTEXT RESUME REQUEST before or at a time domain location of the dedicated resource (or "PUR timing") to the MME 340. The location of a CP PUR resource may trigger the establishment of an S1 interface connection between eNB 330 and MME 340.

If the UE 320 monitors the PDCCH search space corresponding to a PUR resource, the eNB 330 may trigger the establishment of the UE Specific connection between the eNB 330 and the core network 340 as long as the PUR resource location is reached. If the UE 320 does not send uplink data over the PUR resource, the uplink data to eNB 330, but the UE 320 still monitors the PDCCH search space corresponding PUR resource, the eNB 330 may establish a UE Specific connection between the eNB 330 and the core network 340 at the PUR resource location.

Step 306B: The MME 340 may transmit a UE CONTEXT RESUME RESPONSE to the eNB 330 based on receiving the UE CONTEXT RESUME REQUEST 305B.

Step 307B: The MME 340 may transmit a downlink NAS transport message to the eNB 330.

Step 308B: The eNB 330 may transmit an PDCCH message for a downlink grant to the terminal 320.

Step 309B: The eNB 330 may transmit an PDSCH message to the UE 320 that includes a DL data.

Step 310B: The eNB 330 may transmit an RRC connection release message to the UE 320. The UE 320 may transition from a RRC idle mode USS monitoring status T3B to a RRC idle state T4B based on receiving the RRC connection release message 310B.

Step 311B: the eNB 330 may transmit a message to the MME 340 using UE-specific signaling. The UE specific signaling may be a UE CONTEXT SUSPEND REQUEST or another dedicated message.

Step 312B: The MME 340 may transmit a UE CONTEXT SUSPEND RESPONSE 312B to the eNB 330 based on receiving the UE CONTEXT SUSPEND REQUEST 311B.

Figure 3C:
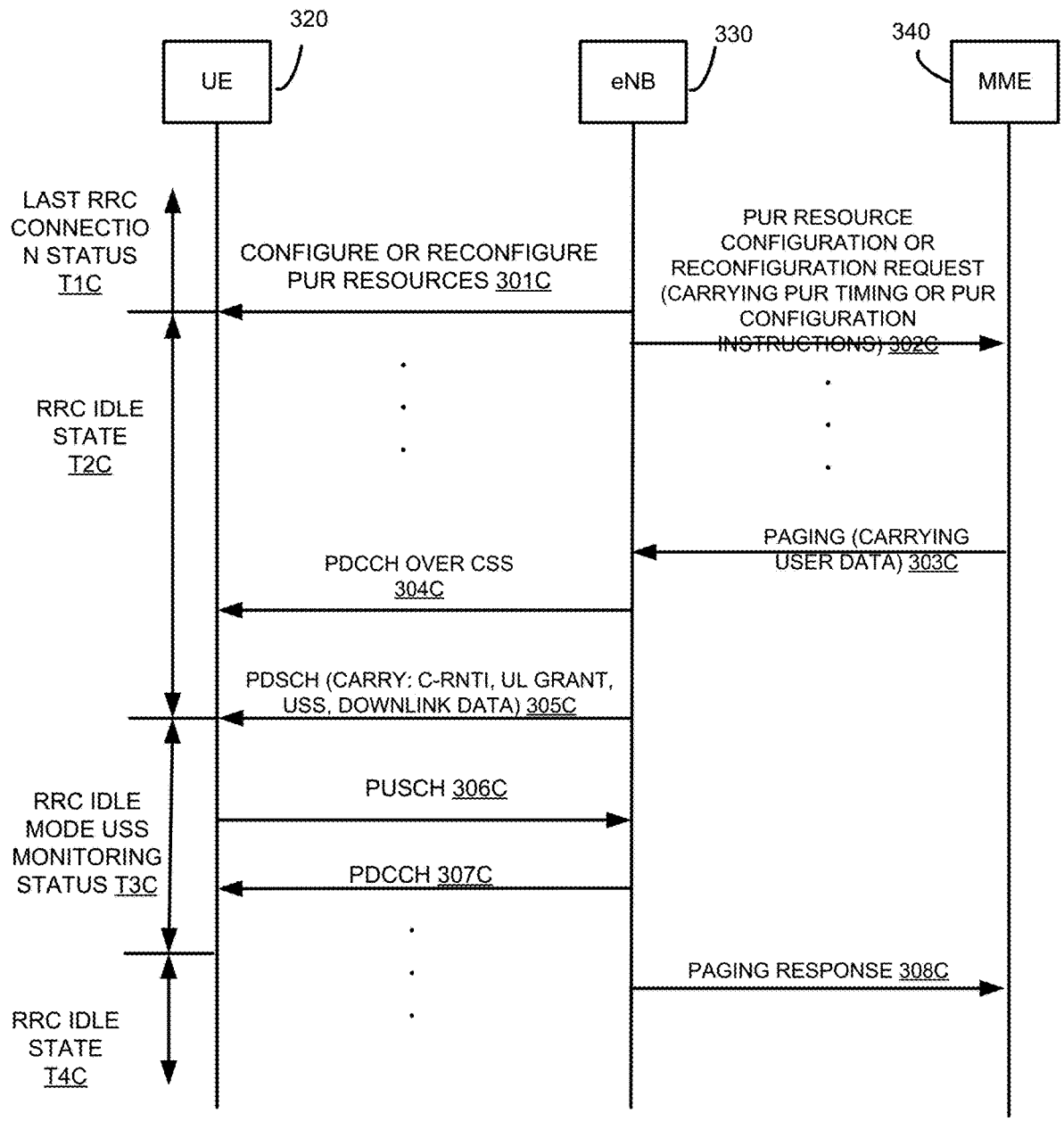

FIG. 3C illustrates a determination of whether paging can include user data based on preconfigured dedicated resource configurations. In Step 301C, the eNB 330 transmits a configure/reconfigure PUR resources message to the UE 320. The UE 320 may transition from a last RRC connection status T1C to a RRC idle state T2C.

Step 302C: the eNB 330 may transmit a PUR resource configuration/reconfiguration request to the MME 340. When the eNB configures or reconfigures the PUR resource, the eNB 330 may send the PUR resource configuration or reconfiguration information to the MME 340.

The sending of the PUR resource configuration or reconfiguration information to the MME may be performed by one of the following: a UE Specific S1 interface signaling sent by the eNB 330 to the MME 340 (e.g., UE CONTEXT RELEASE REQUEST, UE CONTEXT RELEASE COMPLETE, UE CONTEXT MODIFICATION RESPONSE, UE CONTEXT MODIFICATION FAILURE, UE RADIO CAPABILITY MATCH RESPONSE, UE CONTEXT MODIFICATION INDICATION, UE CONTEXT SUSPEND REQUEST, UE CONTEXT RESUME REQUEST, INITIAL UE MESSAGE, NAS NON DELIVERY INDICATION, NAS DELIVERY INDICATION, etc.). The PUR resource configuration or reconfiguration information may be time domain location information of the PUR resource, PUR resource presence indication information, or other information related to the PUR resource configuration.

Step 303C: The MME 340 may transmit paging information to the eNB 330. When the MME 340 has downlink data to be sent to the UE 220, if the UE 320 has the PUR resource configuration, the MME 340 may include the data in the Paging message. If the UE 320 does not have the PUR resource configuration, the MME 340 may first send the eNB 330 paging message is sent, and then transmit the downlink data to the eNB 330 after receiving a message in response to the first paging message.

Step 304C: the eNB 330 may transmit a PDCCH associated with a common RNTI over PDCCH common search space (CSS) to the UE 320. When the eNB 330 receives a paging message (with or without user data) message, if the UE 320 has a pre-configured PUR resource, the UE 320 may perform DL Grant scheduling on the CSS-Paging and send the DL Grant to the UE 320. The common RNTI may include at least one of: a Paging-RNTI, a common RNTI for Paging with data, a common RNTI for data. The PDCCH common search space may include at least one of: a PDCCH search space for paging, a PDCCH common search space for Paging with data, a PDCCH common search space for data. The PDCCH common search space may include at least one of: sent by a SIB, sent by a dedicated RRC signaling, a CSS set sent by SIB and a UE specific index to the CSS sent by a dedicated RRC signaling, a CSS sent by SIB and a UE specific PDCCH repetition number sent by a dedicated RRC signaling.

Step 305C: The eNB 330 may transmit a PDSCH message to the UE 320. The PDSCH channel may carry dedicated resource configuration information and/or downlink user data in a paging message. The dedicated resource configuration information may include at least one of the following: a UE-specific RNTI (such as a C-RNTI), an uplink grant resource (UL Grant) used for at least one of Scheduling Request (SR), Buffer Size Report (BSR), ack for the DL user data, a PDCCH search space (such as a USS) corresponding to the dedicated resource, and a PDCCH search space monitoring time.

Step 306C: The UE 320 may transmit a PUSCH message to the eNB 330. When the UE 320 receives the PDSCH channel, if data is carried on the PDSCH channel, the UE 320 may confirm the data by using the PUSCH over UL Grant. If there is no data on the PDSCH channel, the UE 320 may send a message to the eNB 320 through the PUSCH over UL Grant including at least one of a RRC Msg3, a SR, a BSR, a Paging Acknowledge. This message may trigger the S1 interface UE Specific connection establishment so that the MME 340 may transmit downlink data to the eNB 330.

Step 307C: The eNB 330 may transmit a PDCCH message to the UE 330.

Step 308C: The eNB 330 may transmit a paging response message to the MME 340. When the eNB 330 receives the acknowledgment of the data from the UE 320 through the PUSCH over UL Grant, the eNB 330 may transmit a Paging acknowledgment to the MME 340 and the downlink data transmission is completed.

Figure 3D:
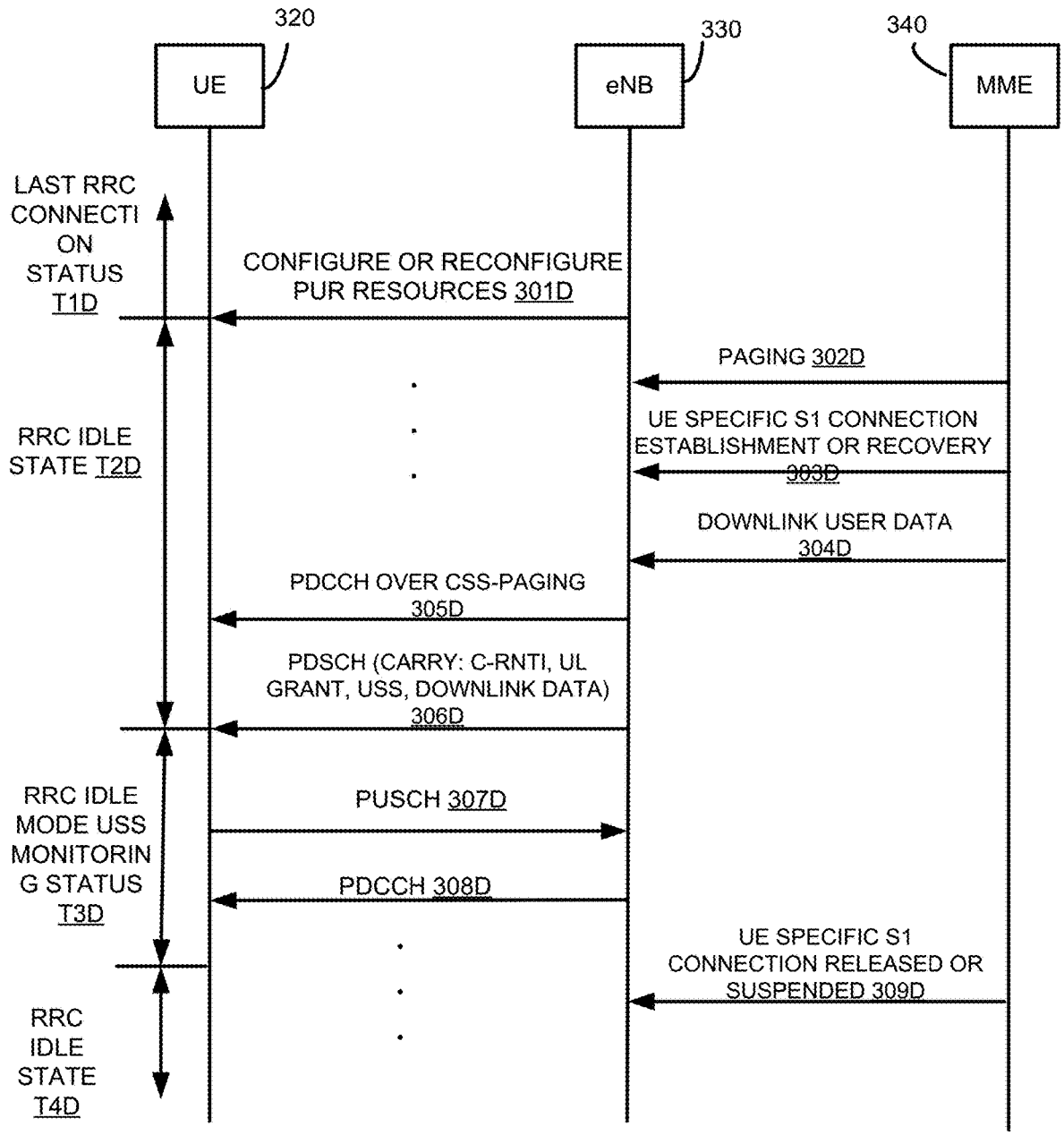

FIG. 3D illustrates transmitting paging information and downlink data to the terminal 320. In Step 301D, the eNB 330 may transmit a message to configure or reconfigure PUR resources to the UE 320. The UE 320 may transition from the last RRC connection status T1D to a RRC idle state T2D based on receiving the message 301D.

Step 302D: the MME 340 may transmit a paging message to the eNB 330 (without carrying any downlink user data).

Step 303D: The eNB 330 may directly trigger the establishment or recovery of the UE Specific signaling of the S1 interface based on the PUR resource configuration information, so that the MME 340 sends the user data to the eNB 330. Establishing the S1 interface may be triggered by one of the following messages: UE CONTEXT RESUME REQUEST, INITIAL UE MESSAGE or another newly added S1 port UE Specific signaling.

Step 304D: After the S1 interface connection establishment or recovery of the UE is completed, the MME 340 may send the downlink data to the eNB 330.

Step 305D: After receiving the downlink data of the user, the eNB 330 may perform DL Grant scheduling on the UE 320 through PDCCH associated with a common RNTI over PDCCH common search space (CSS). The common RNTI may include at least one of: a Paging-RNTI, a common RNTI for Paging with data, a common RNTI for data. The PDCCH common search space may include at least one of: a PDCCH search space for paging, a PDCCH common search space for Paging with data, a PDCCH common search space for data. The PDCCH common search space may include at least one of: sent by a SIB, sent by a dedicated RRC signaling, a CSS set sent by SIB and a UE specific index to the CSS sent by a dedicated RRC signaling, a CSS sent by SIB and a UE specific PDCCH repetition number sent by a dedicated RRC signaling.

Step 306D: The eNB 330 may transmit a PDSCH message over a PDSCH channel on the DL Grant. The PDSCH channel may carry dedicated resource configuration information and downlink user data. The dedicated resource configuration information may include at least one of the following: a UE-specific RNTI (such as a C-RNTI), an uplink grant resource (UL Grant) used for at least one of Scheduling Request (SR), Buffer Size Report (BSR), ack for the DL user data, a PDCCH search space (such as a USS) corresponding to the dedicated resource, and a PDCCH search space monitoring time.

Step 307D: the UE 320 may transmit a PUSCH message over the UL grant to the eNB 330. The message 307D may include at least one of a RRC Msg3, a SR, a BSR, a Paging Acknowledge, a DL data Acknowledge.

Step 308D: The eNB 330 may transmit a PDCCH message to the UE 320.

Step 309D: After the uplink and downlink data transmission is completed, the eNB 330 may trigger the S1 interface UE specific connection release or suspension process with the MME 340. The S1 interface UE specific may be released based on receiving one of the following messages: a UE CONTEXT SUSPEND REQUEST, a UE CONTEXT RELEASE REQUEST or another newly added S1 interface UE Specific signaling.

Example Embodiment 3

Figure 4A:
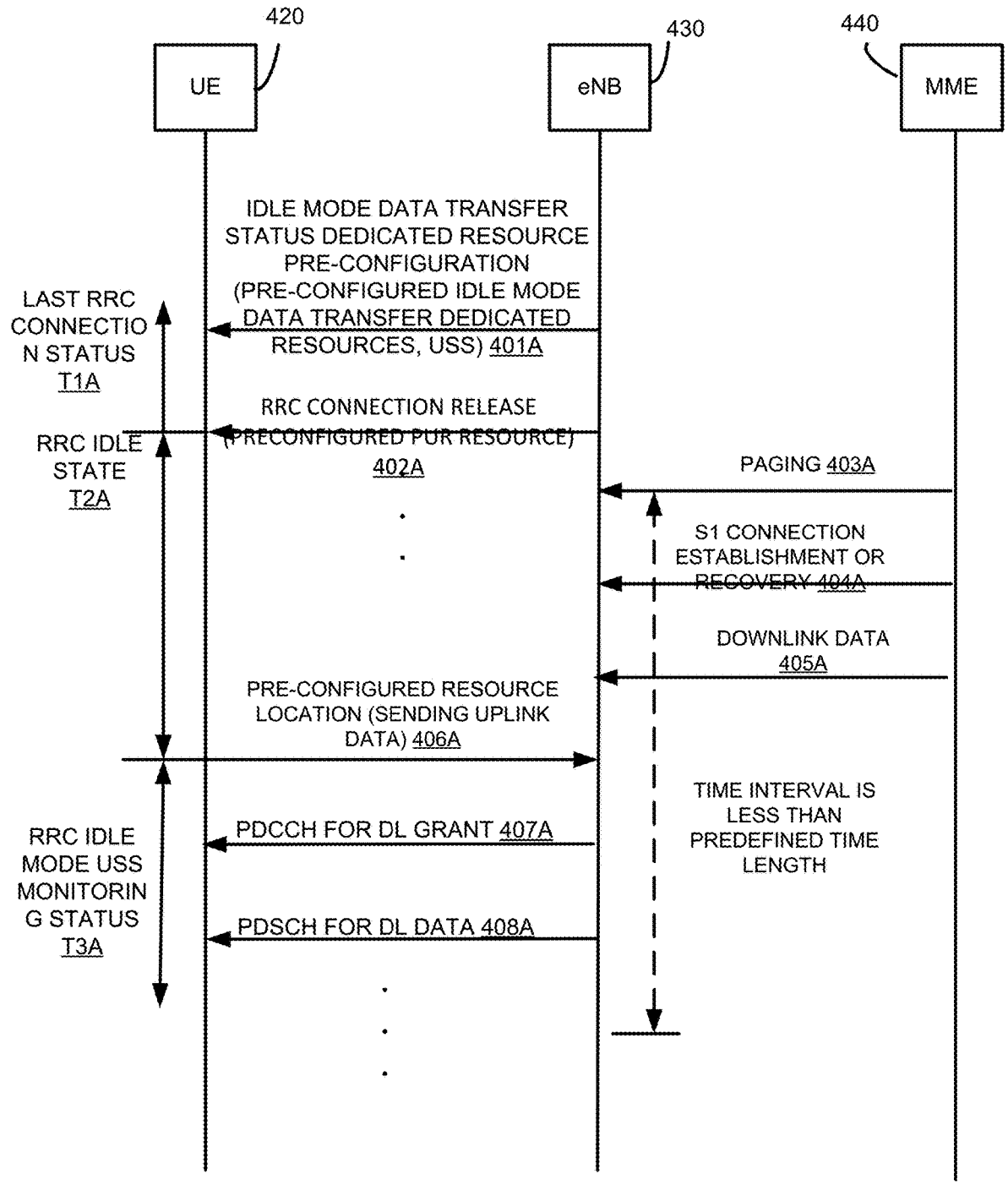
FIGS. 4A-C illustrates examples of processing a coupling between paging information and preconfigured dedicated resources
Figure 4B:
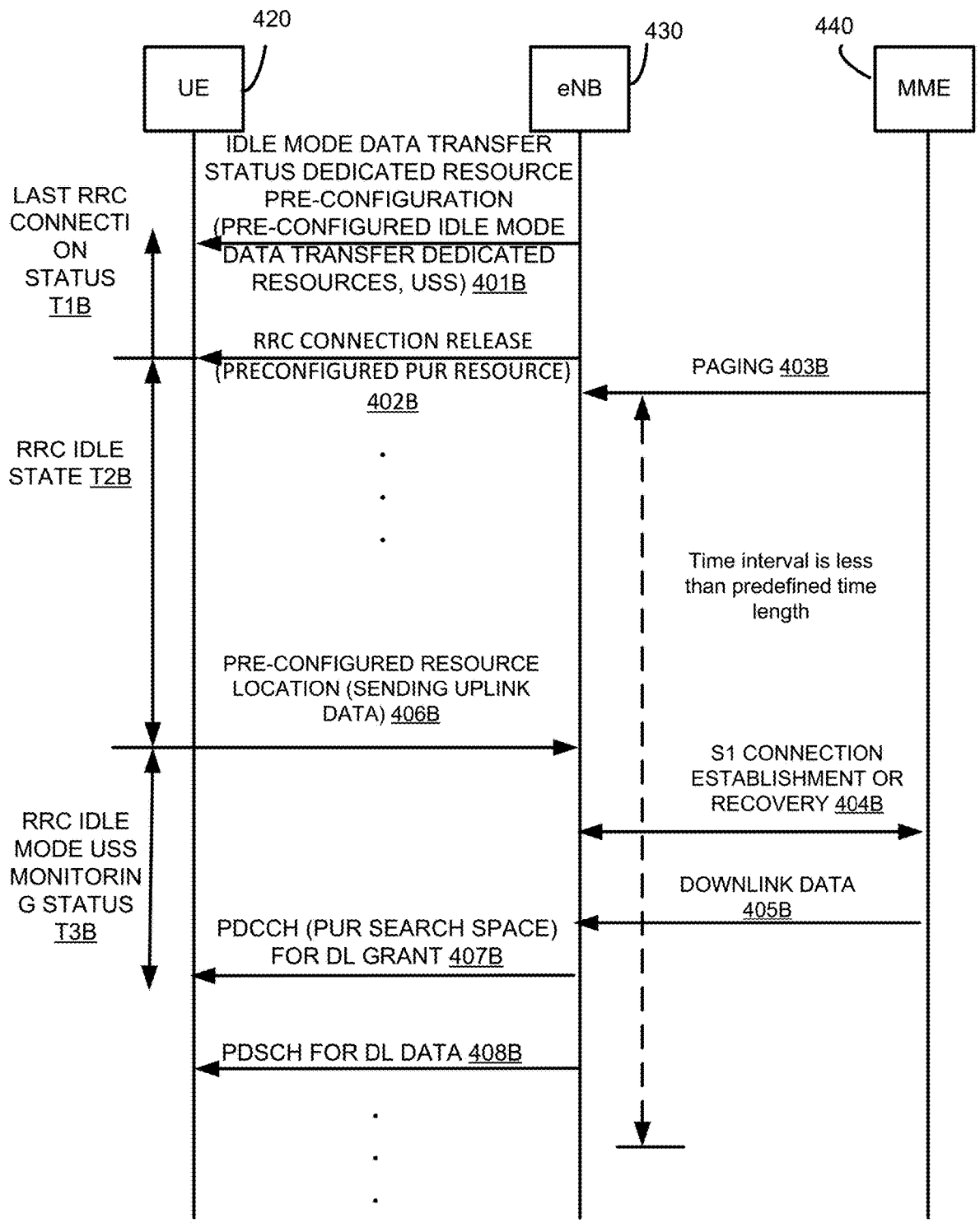
Figure 4C:
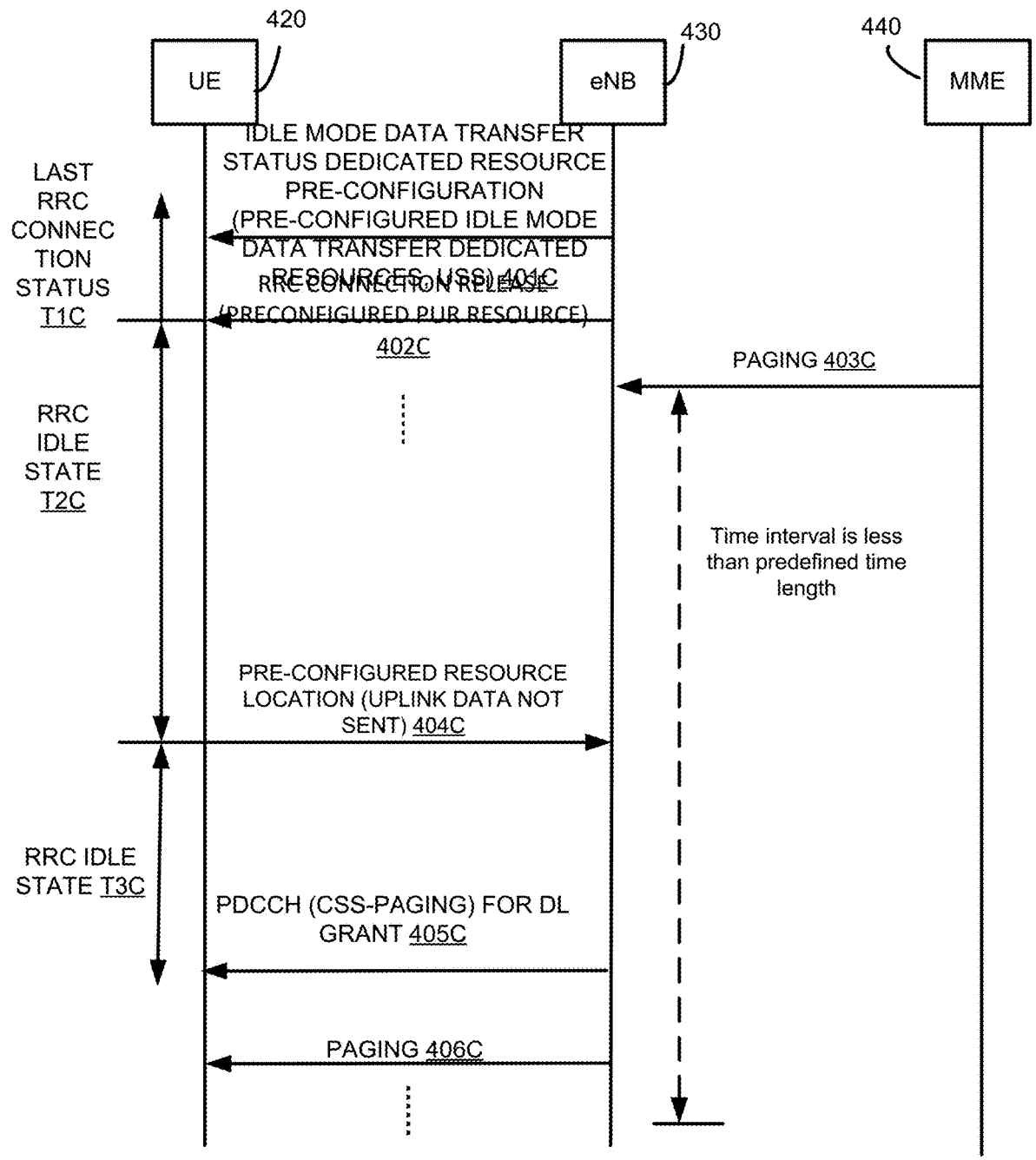

FIGS. 4A-C illustrates examples of processing a coupling between paging information and preconfigured dedicated resources. FIG. 4A illustrates an example of paging and PUR coupling. The eNB 430 may receive a paging message (paging 403A) from a MME 440 within a predefined time period before a valid preconfigured dedicated resource (e.g., PUR). In other words, the time interval between the paging message and the preconfigured dedicated resource is less than a predetermined time length. The eNB 430 may determine to delay the paging message (paging 403A) based on the PUR.

If the UE 420 still monitors the terminal-specific PUR search space (PUR-USS) even it does not transmit uplink data on the PUR, the eNB 430 may initiate a UE specific S1 connection establishment or recovery (e.g., S1 connection establishment or recovery 404A upon receiving a paging message (paging 403A) from a MME 440 before the PUR resource location.

The eNB 430 may receive downlink data (e.g., downlink data 405A) from the MME 440 on the UE specific S1 connection. The eNB 430 may send PDCCH with the PDCCH search space that corresponds to a relevant PUR resource, where the downlink PDCCH may include using a dedicated RNTI to perform downlink resource scheduling for downlink data transmission to the UE 420.

FIG. 4B illustrates an example of paging and PUR coupling. A preconfigured dedicated resource-specific PDCCH search space (PUR-USS) may not be monitored if the UE 420 does not transmit data (uplink data) at the PUR resource location (e.g., preconfigured resource location 406B). If the eNB 430 receives uplink data on the PUR resource (e.g., at the preconfigured resource location 406B), the eNB 430 may trigger an establishment of an S1 interface with the MME 440 (S1 connection establishment or recovery 404B). In this event, the eNB 430 may not transmit a paging message to the UE 420.

FIG. 4C illustrates an example of paging and PUR coupling when a terminal 420 does not transmit data. The eNB 430 may not receive uplink data on the PUR resource from the UE 420 (e.g., preconfigured resource location (uplink data not sent) 404C). In this event, the eNB 430 may not monitor a PDCCH search space corresponding with the PUR. After the ending of the PUR resource (or preconfigured resource location), the eNB 430 may schedule a paging message (paging 406C) to be sent to the UE 420 through CSS-paging.

In any of FIGS. 4A-C, the predefined time period may include a duration that does not exceed a MME 440 paging retransmission timer (e.g., 15 seconds) if the paging message does not carry a paging eDRX parameter. The predefined time period may be a duration that does not exceed a minimum (e.g., the MME 440 paging retransmission timer, paging time window (PTW) length) if the paging messages carrier a eDRX parameter. The valid PUR resource may identify that the PUR resource may be configured for the UE 420, and the PUR resource is available (e.g. TA is valid, and the cell reselection does not occur etc). The paging retransmission timer may be defined by a communication node and/or sent from the core network, and the communication node may be configured to define and/or modify the predetermined time duration.

Example Embodiment 4

Figure 5:
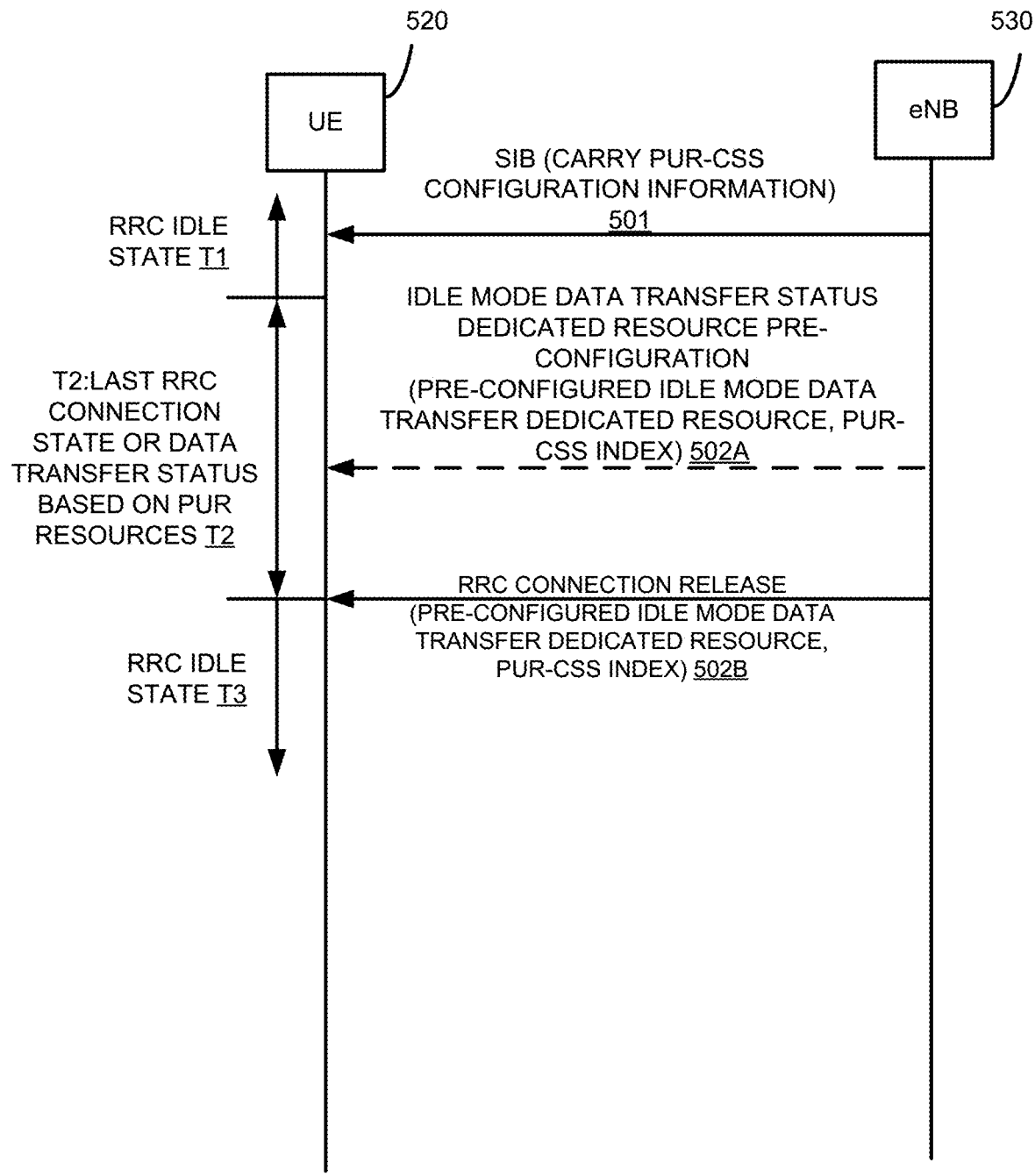
FIG. 5 illustrates a pre-configured dedicated resource common search space configuration.

FIG. 5 illustrates a pre-configured dedicated resource PDCCH common search space configuration. In Step 501: The eNB 530 configures a PDCCH common search space (CSS) corresponding to the PUR resource for the UE 520. The PUR-CSS configuration information may be sent to the UE 520 via a system information block (SIB). The PDCCH CSS may include at least one of a PDCCH monitoring mode sets with different enhanced coverage level configurations, a PDCCH monitoring mode without enhanced coverage level differentiation.

Each PDCCH monitoring mode may include a starting position of PDCCH monitoring or a parameter for determining a PDCCH monitoring starting position, a time interval for PDCCH monitoring, a parameter for determining a PDCCH monitoring time interval, and a maximum number of repetitions of the PDCCH.

Step 502A: The eNB 530 may configure a PUR dedicated resource and at least one of a PUR-CSS index and a PDCCH repetition number corresponding to the PUR dedicated resource. The eNB 530 may transmit the configuration to UE 520 during the last RRC connection state when configuring the PUR dedicated resource for idle mode data transmission. The UE 520 may monitor a monitoring duration of the PUR-CSS from the PUR dedicated resource location. The eNB 530 may transmit an idle Mode data Transfer status dedicated resource pre-configuration that includes a reconfigured idle mode data transfer dedicated resource and a PUR-CSS index.

Step 502B: The eNB 530 may configure the PUR-specific resource and at least one of a PUR-CSS index and a PDCCH repetition number corresponding to the PUR specific resource and the monitoring duration of the PUR-CSS by using the RRC connection release message in the RRC connection state or the PUR resource-based data transmission state. The PUR-CSS index corresponding to the PUR dedicated resource may include a coverage level index at which the UE 520 is located.

Example Embodiment 5

FIGS. 6A-H illustrate various terminal-specific pre-configured dedicate resource configuration methods. The eNB 630 may configure a PUR resource for a terminal 620, where the terminal 620 may be configured to configure at least one of a UE-specific PUR PDCCH search space, a maximal monitoring during (PUR-USS-Duration) and a monitoring timer (PUR-USS-Timer), UE specific RNTI corresponding to the PUR PDCCH search space. Wherein the UE specific RNTI corresponding to the PUR PDCCH is valid only when the terminal 620 monitors the PUR PDCCH search space or during the pur-USS-Duration from the beginning of PUR-USS monitoring.

The UE-specific PUR PDCCH search space (PUR USS) may include a start position of PDCCH monitoring or a parameter for determining a PDCCH monitoring start position, a time interval for PDCCH monitoring, a parameter for determining a PDCCH monitoring time interval, and a PDCCH maximum number of repetitions. The UE 620 may start or restart the PUR-USS-Timer when the PUR-USS monitoring starts or when there is no data transmission and reception. If the PUR-USS-Timer times out, the UE 620 may enter a RRC idle mode.

Figure 6A:
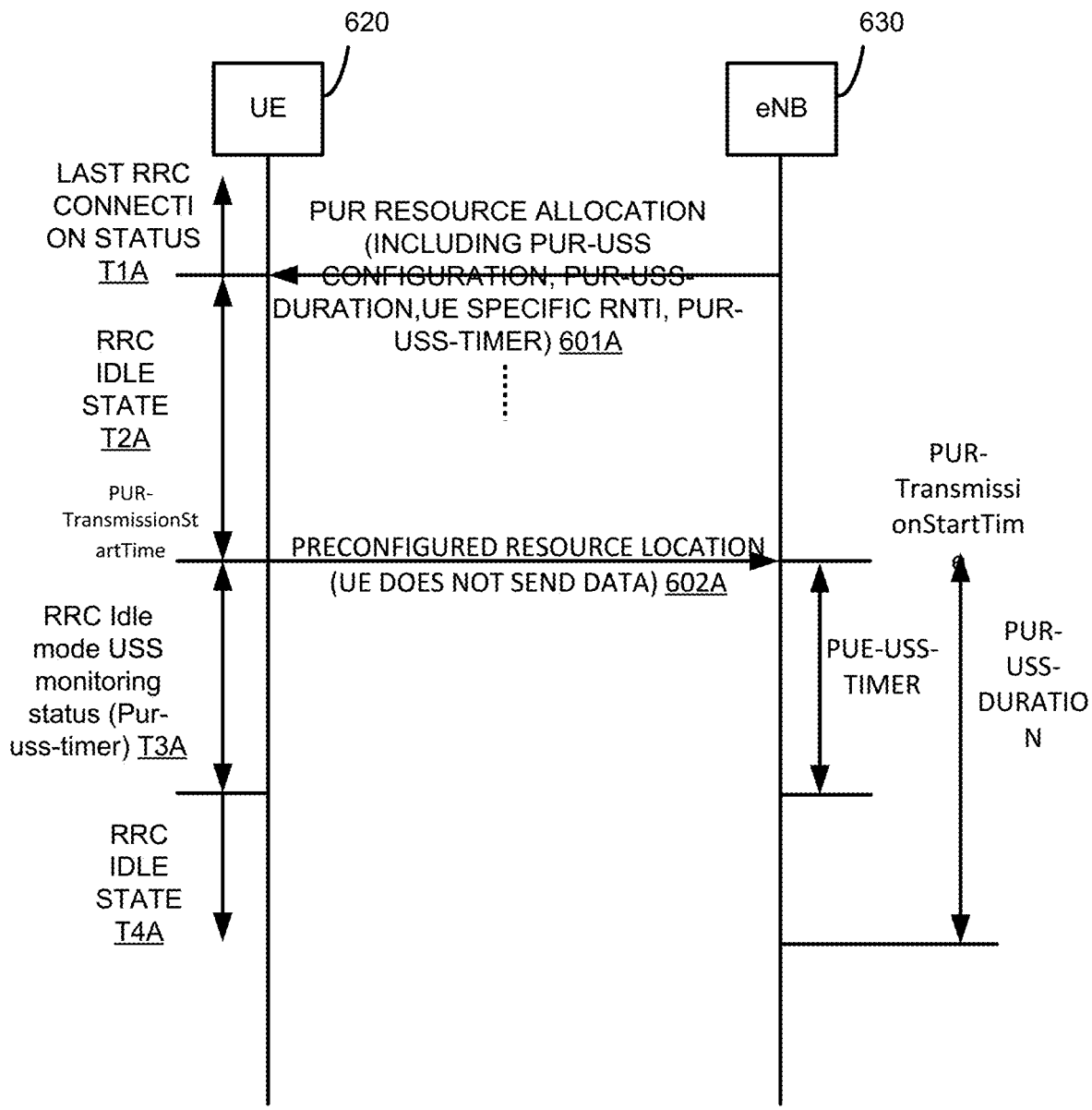
FIGS. 6A-H illustrate various terminal-specific pre-configured dedicate resource configuration methods.

In FIG. 6A, if the UE does not send data on the PUR resource (e.g., pre-configured resource location (UE does not send data) 602A), the timer (PUR-USS-Timer) may be started in the PUR resource location, and the UE 620 may enter the PUR-USS monitoring state T3A. If the timer expires and the PDCCH scheduling information is not monitored, the UE 620 enters an idle state T4A.

Figure 6B:
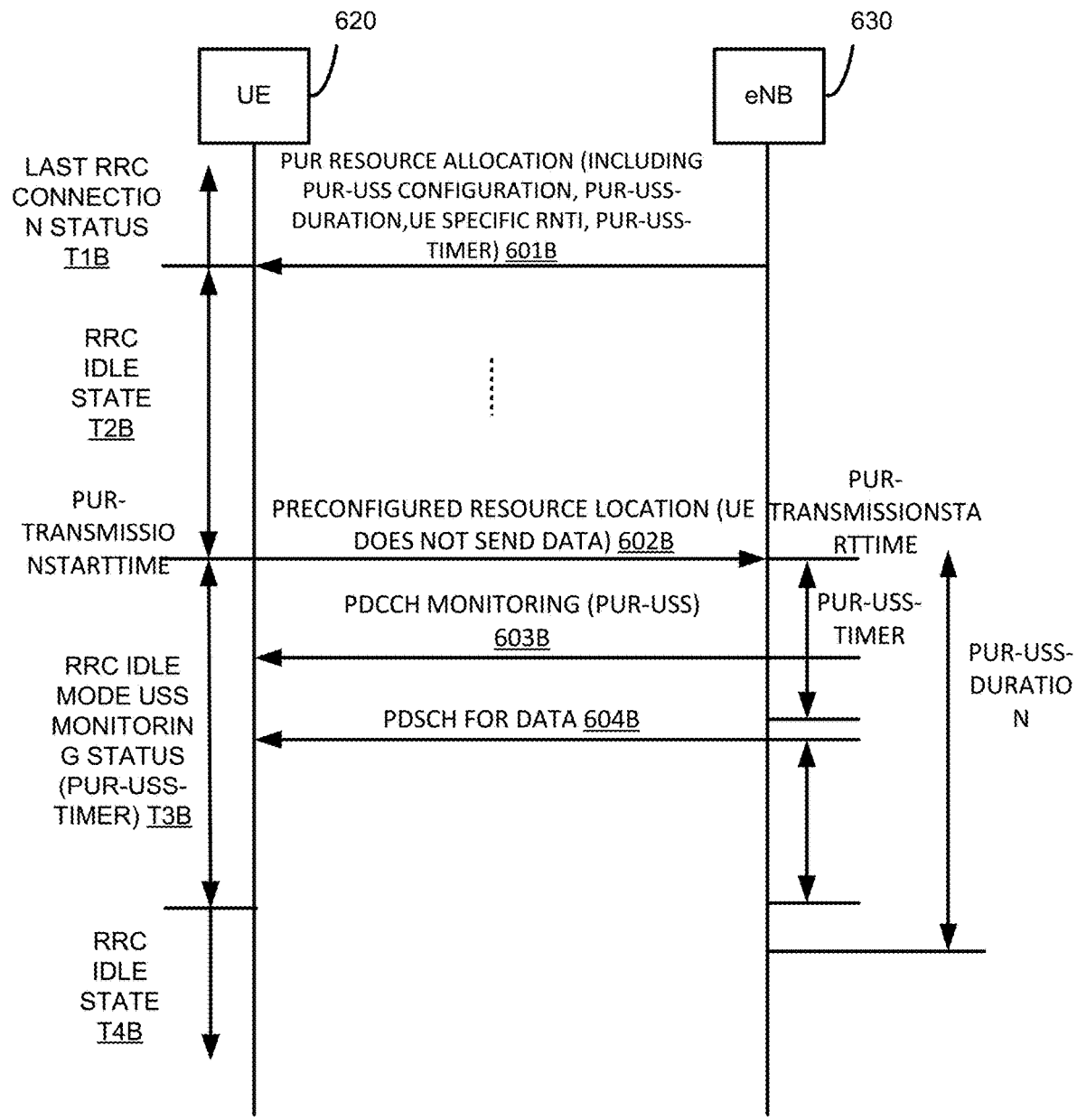

In FIG. 6B, if a UE 620 does not transmit any data on the PUR (or preconfigured resource location) and also monitors a terminal-specific preconfigured PDCCH search space (PUR-USS), a preconfigured resource timer (PUR-USS-Timer) may start at a PUR resource location. If the PDCCH scheduling information is monitored before the timer expires, the UE 620 may perform data transmission and reception based on the scheduling information. When data is sent and received, the UE 620 may start or restart the timer (PUR-USS-Timer), and if the timer expires, the UE 620 may enter an idle state T4B.

Figure 6C:
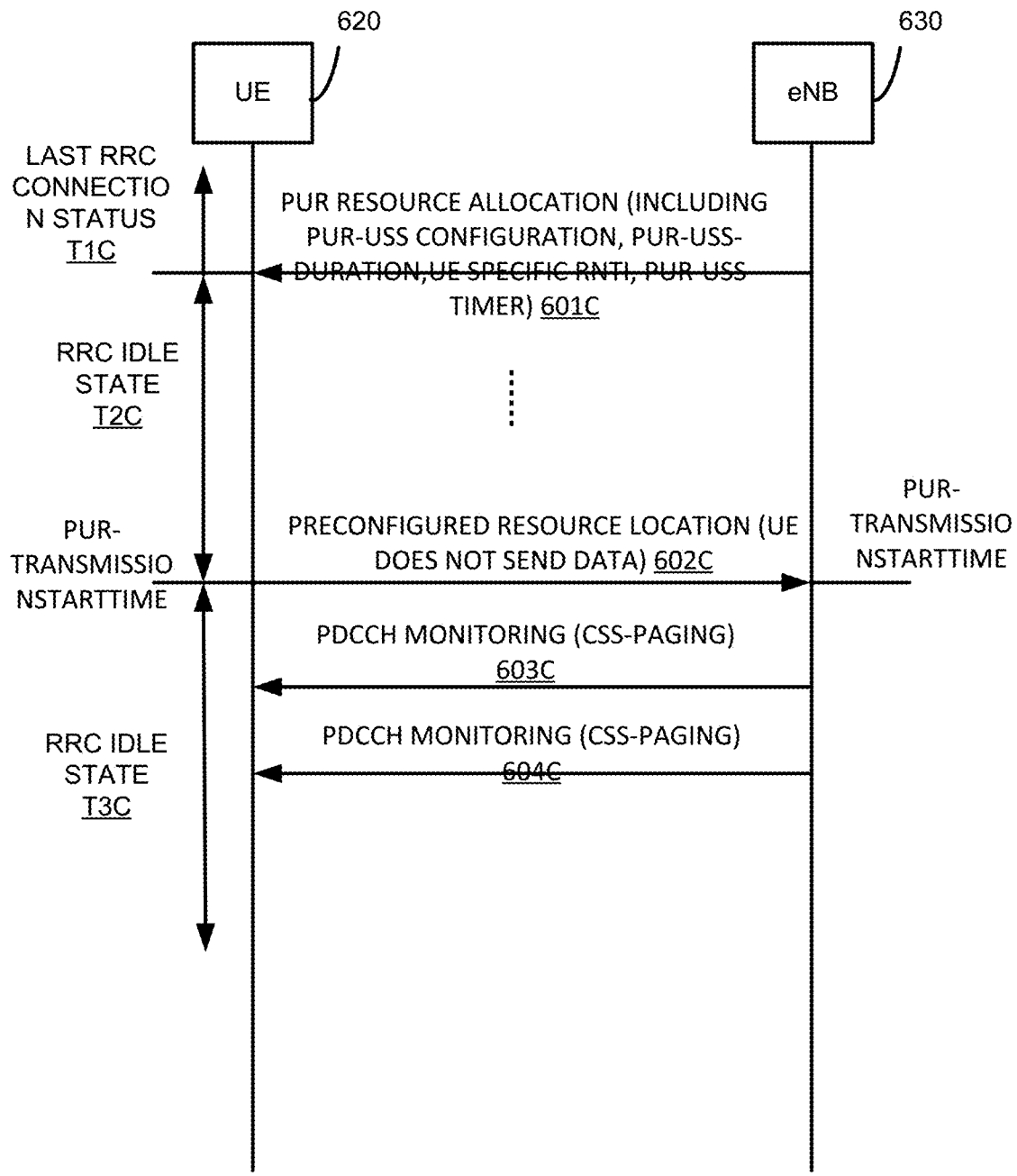

In FIG. 6C, if the UE 620 does not monitor a PUR-USS without transmitting data on the PUR, if the UE 620 does not send data on the PUR resource, the UE 620 may enter an idle mode. For example, monitoring the idle mode may include scheduling the paging space CSS-Paging.

Figure 6D:
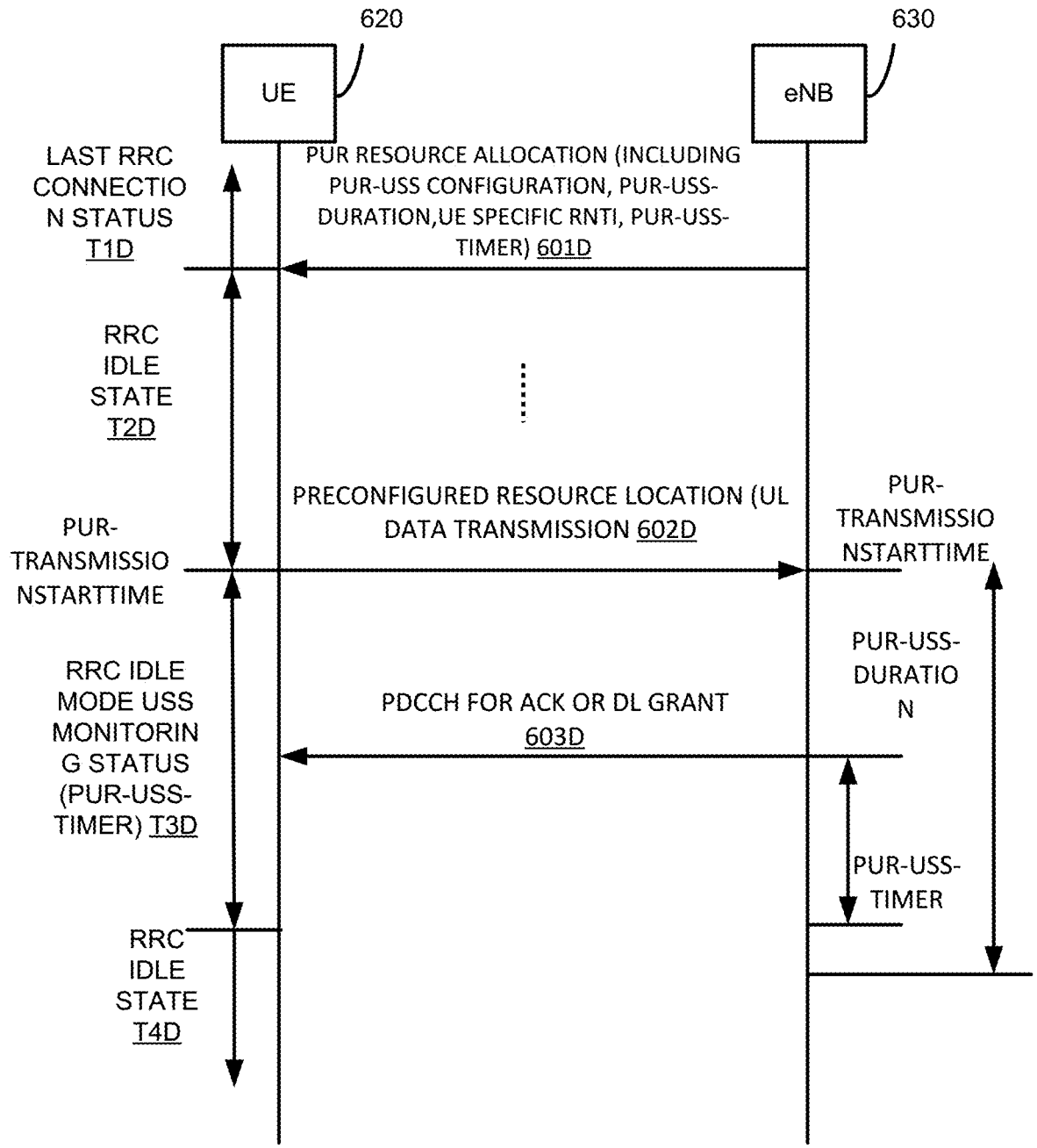

In FIG. 6D, if the UE 620 performs data transmission on the PUR resource, the timer (PUR-USS-Timer) may be started or restarted after the data transmission and reception is completed. If the timer expires, the UE may enter an idle state T4B. If the eNB 630 wants the UE 620 to stop PUR-USS monitoring before the timer expires, or if it wishes to reconfigure the PUR resource, the eNB 630 may send an instruction (PDCCH for ack or DL grant 603D) to the UE 620 to notify the PUR-USS to stop monitoring before the timer expires. The instruction may be indicated by a PDCCH DCI, a downlink MAC CE scheduled by the PUR-USS, an RRC dedicated signaling scheduled by the PUR-USS, or an acknowledgement indication of the uplink data. After receiving the relevant indication, the UE 620 may perform an indication response, and/or stops monitoring of the PDCCH search space.

Figure 6E:
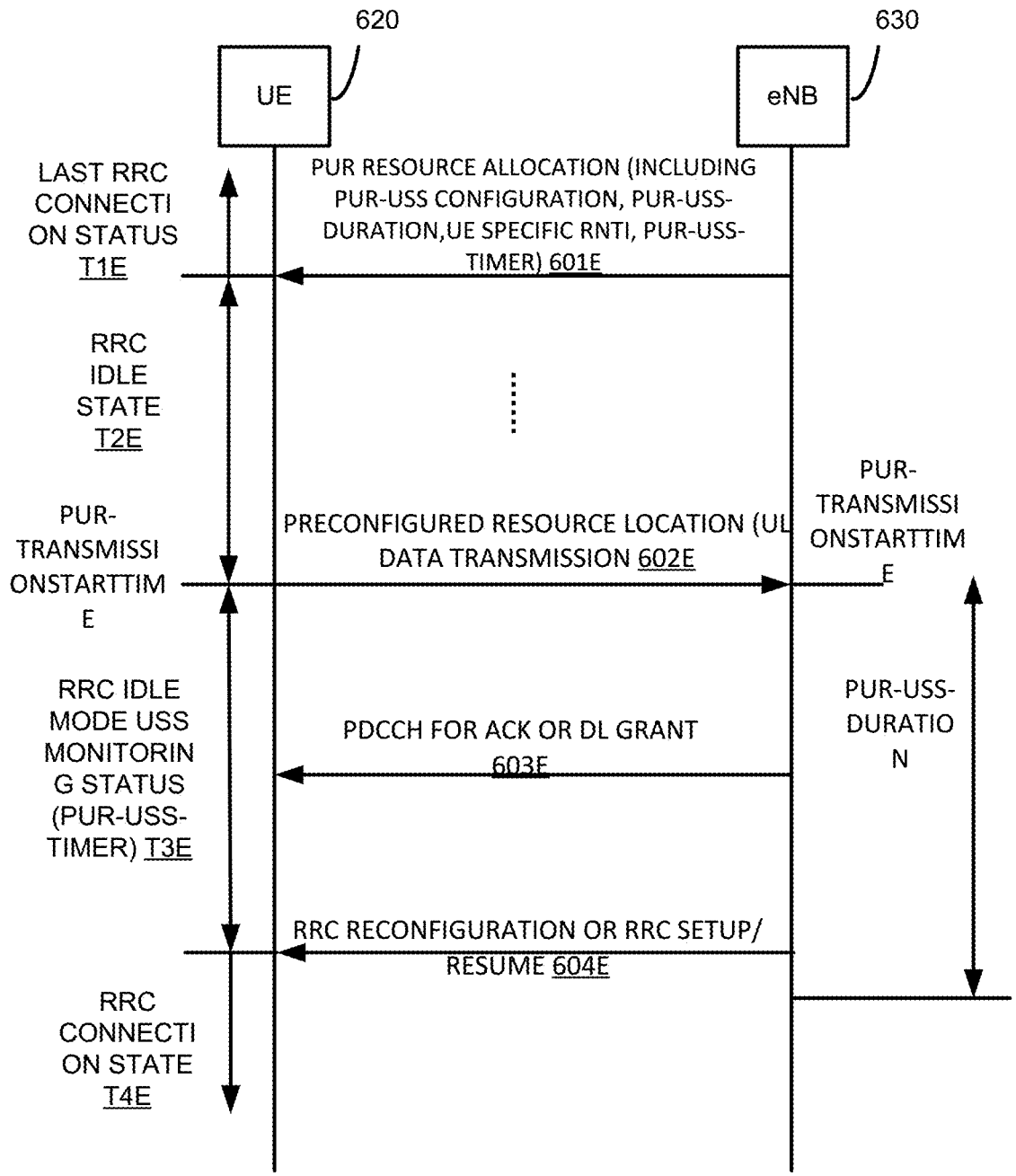

In FIG. 6E, if the UE 620 performs data transmission on the PUR resource, the timer (PUR-USS-Timer) may be started or restarted after the data transmission and reception is completed. If the eNB 630 wants the UE 620 to transition to the RRC connection state T4E, a status indication command (e.g., RRC reconfiguration or RRC setup/resume 604E) may be sent to the UE 620 before the PUR-USS-Timer may time out, indicating that the UE 620 transitions to the RRC connected state. The status indication command 604E may be a RRC connection establishment message, RRC connection resume message, RRC connection reconfiguration message, a newly defined RRC dedicated downlink signaling message, a medium access control (MAC) control element (CE) including the indication command, or a PDCCH DCI including the indication command. The RRC reconfiguration or RRC setup/resume message 604E may carry a C-RNTI.

If the UE 620 receives the indication command, the UE 620 may transition to the RRC connection state based on the indication command 604E. If the C-RNTI is carried in the instruction 604E, the UE 620 may use the C-RNTI in the RRC connected mode T4E. If the C-RNTI is not carried in the instruction 604E, the UE 620 may use the RNTI (a PDCCH that scrambles the original RNTI) that the UE used before receiving the indication 604E.

Figure 6F:
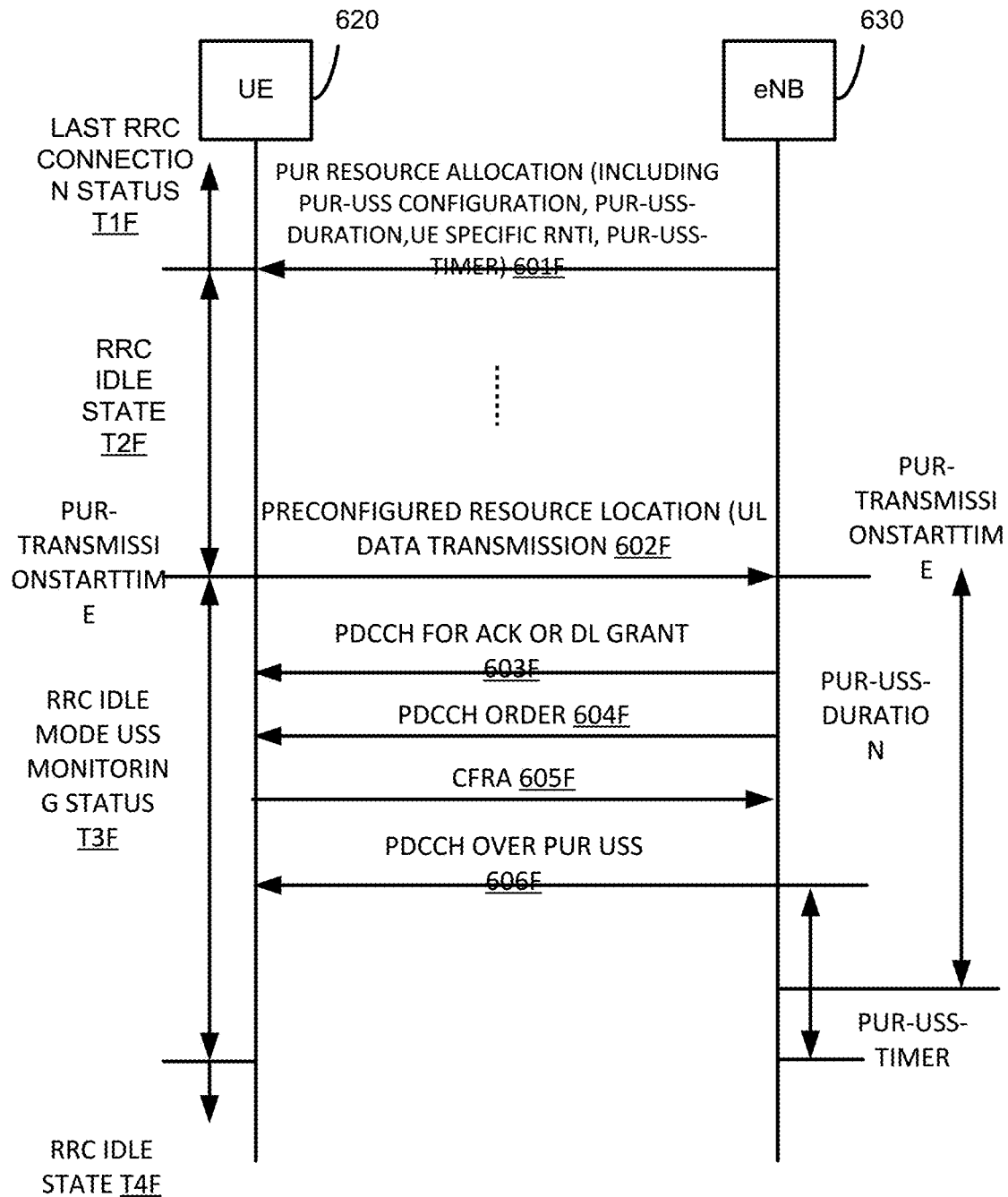

In FIG. 6F, in the PUR-USS monitoring process, even if the eNB 630 sends a PDCCH Order 604F to the UE 620, the PUR-USS is still monitored.

Figure 6G:
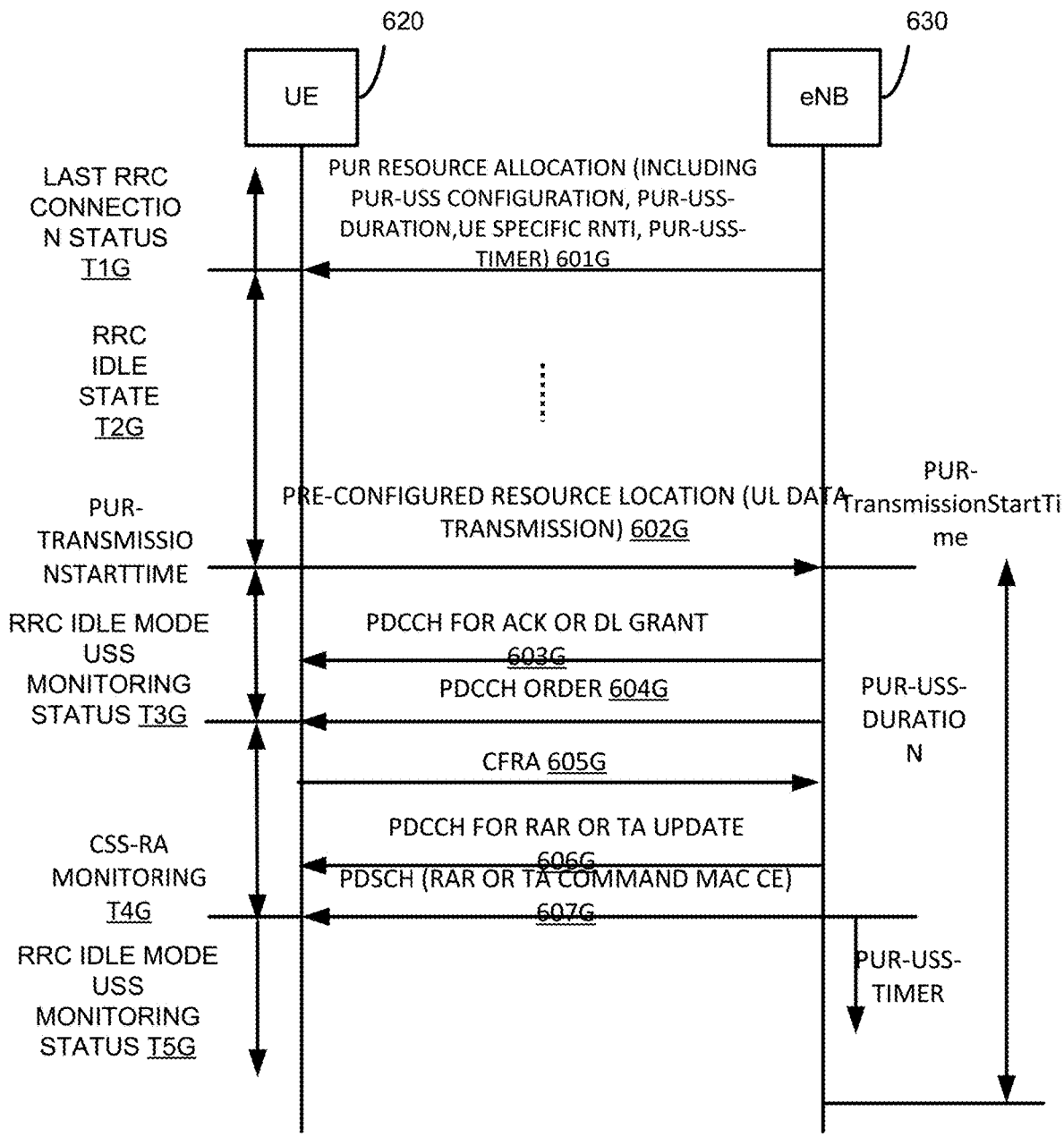
Figure 6H:
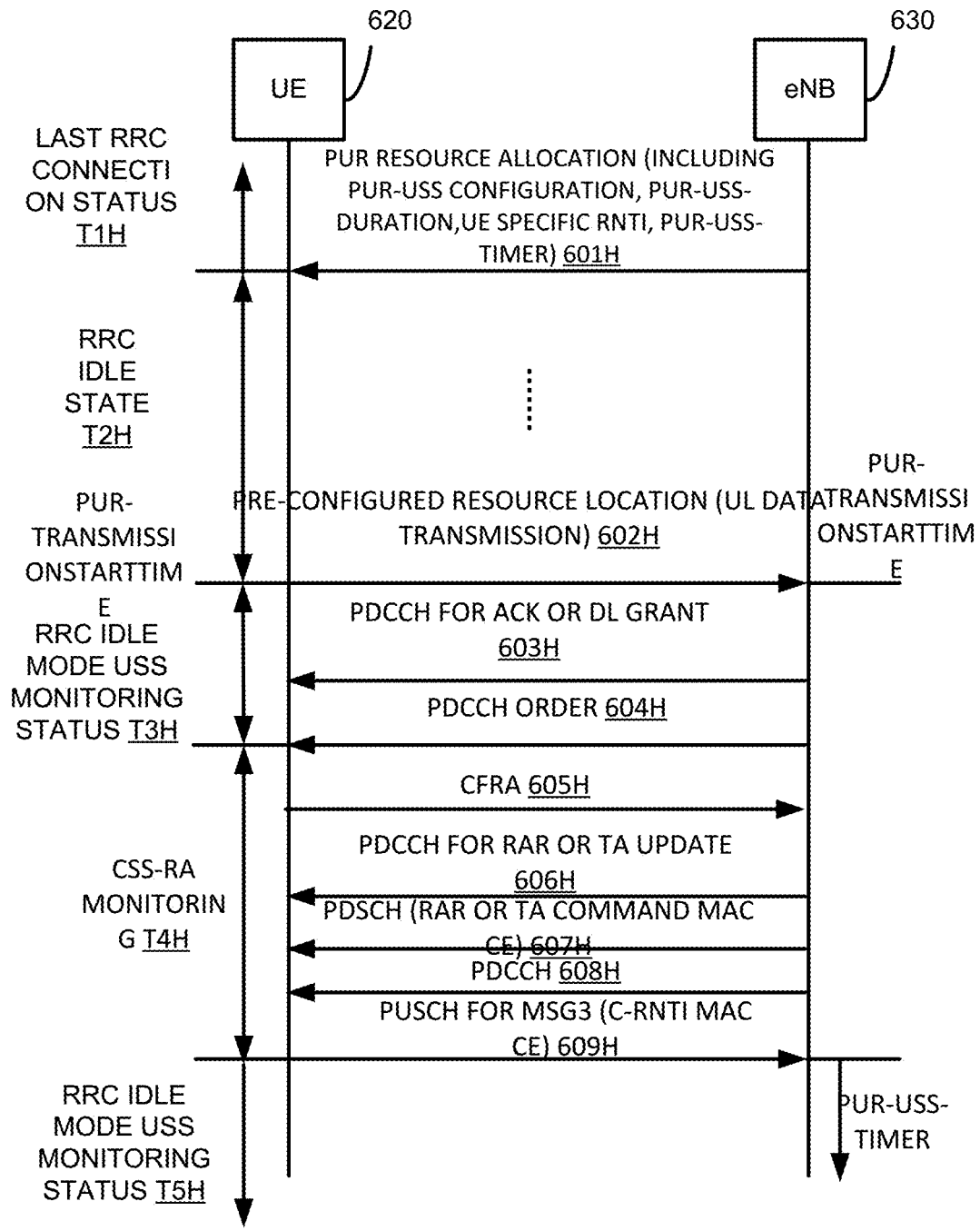

In FIG. 6G and FIG. 6H, during the PUR-USS monitoring process, the PUR-USS may be monitored even if the eNB 630 sends a PDCCH order message to the UE 620. During the PUR-USS monitoring process, if the eNB 630 sends a PDCCH Order (PDCCH order 604G) to the UE 620, the UE 620 may be switched from PUR-USS monitoring to CSS-RA monitoring (if the PUR-USS-Timer is running, it may stop). When the UE receives a RAR or TA Update indication (607) (for example: Timing Advance Command MAC CE) or the UE sends uplink data or contention completion indication (such as C-RNTI MAC CE) to the UE after receiving the RAR, then CSS-RA monitoring ends, the UE 620 may start monitoring the PUR-USS.

Example Embodiment 6

Figure 7:
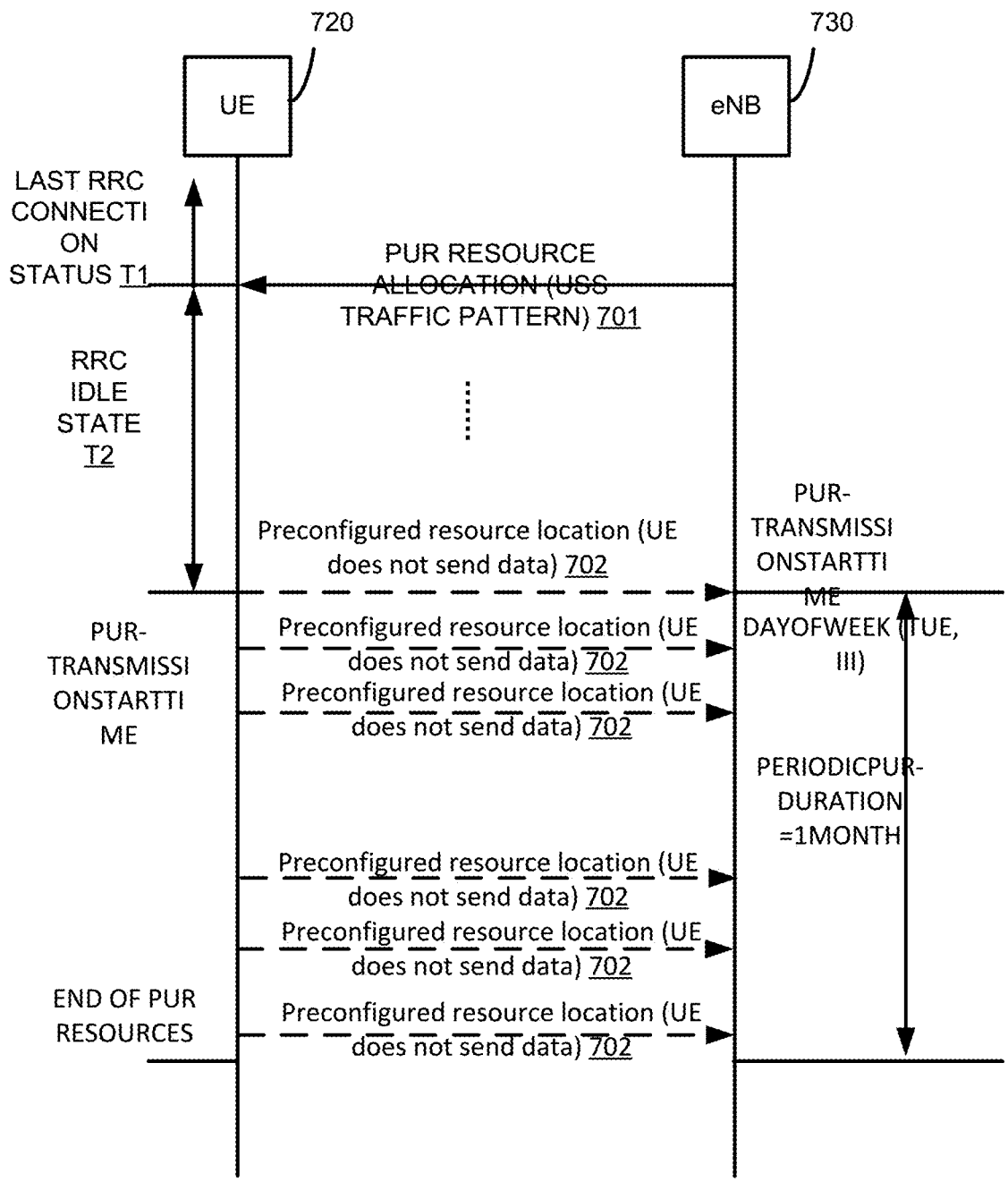
FIG. 7 illustrates an example PUR pattern.

FIG. 7 illustrates an example PUR pattern. When a PUR resource is configured for the UE 720, the PUR pattern corresponding to the traffic pattern may be configured for the UE 720. The PUR Pattern may include a PUR transmission start time, a periodic PUR transmission interval, a maximum valid duration of a periodic PUR resource, a valid timer, and superposition information of a plurality of service patterns.

The PUR transmission start time may be expressed by absolute time (for example: PUR transmission start time PUR-TransmissionStartTime, such as YY:MM:DD:HH:MM:SS; radio frame RF and radio subframe SF at which PUR resource transmission starts. In an embodiment, the PUR transmission start time may be expressed by relative time, such as an offset value relative to an absolute time.

The superposition of the plurality of service modes may include a transmission time sequence expressed in a valid bit sequence (e.g., dayofWeek BIT STRING (SIZE(7)) or dayofMonth BIT STRING (SIZE(31)), hourofDay BIT STRING (SIZE(24))). The superposition of the plurality of service modes may include a set of configuration sets of multiple service patterns, where each set of service patterns corresponds to a configuration index and is used for reconfiguration, release, scheduling, etc., of the service pattern.

The superposition of the plurality of service patterns may include the superposition of a transmission time series with multiple sets of service pattern configuration sets.

As an example, a PUR-TransmissionStartTime is set to: 2019-01-01 00:00:00 RF=0, SF=0, and dayofWeek is set to: 118000. The periodic PUR-Duration is set to: 30 days. Then, from the 2019-01-01 00:00:00, the first occurrence of the RF0, SF0 is the starting position of the first PUR resource. Thereafter, the RF0, SF0, which appears for the first time after 00:00:00 on Monday, Tuesday, and Wednesday, has a PUR resource location. The PUR resource appears in this pattern and does not appear until 2019-01-30 23:59:59.

The transmission sequence of the one UE may also be split into multiple sets of PUR resource configuration sets. For example, three resource sequences can be expressed as:

```
{PUR configuration index 1:
    The start time of PUR resource block 1; //2019-01-01 00:00:00;
    Period and/or interval of PUR resource block 1; //1 week;
    Scheduling information of PUR resource block 1;
    PUR resource block 1 valid duration; //29~30 days;
 PUR configuration index 2:
    The start time of PUR resource block 2; // 2019-01-02 00:00:00;
    Period and/or interval of PUR resource block 2; //1 week;
    Scheduling information of PUR resource block 2;
    PUR resource block 2 valid duration; //28~29 days
 PUR configuration index 3:
    The start time of PUR resource block 3; // 2019-01-07 00:00:00;
    Period and/or interval of PUR resource block 3; //1 week;
    Scheduling information of PUR resource block 3;
    PUR resource block 3 valid duration; //22~24 days
}.
```

For example, three resource sequences can also be expressed as:

```
{
  The start time of PUR resource;
  PUR resource valid duration;
    {
    PUR configuration index 1:
      Time offset of PUR resource block 1 start time relative to the start
      time of PUR resource: 0 seconds;
      Period and/or interval of PUR resource block 1; //1 week;
      Scheduling information of PUR resource block 1;
    PUR configuration index 2:
      Time offset of PUR resource block 2 start time relative to the start
      time of PUR resource: ://1 day;
      Period and/or interval of PUR resource block 2; //1 week;
      Scheduling information of PUR resource block 2;
    PUR configuration index 3:
      Offset of PUR resource block 3 start time relative to the start time
      of PUR resource; //6 days;
      Period and/or interval of PUR resource block 3; //1 week;
      Scheduling information of PUR resource block 3
    }
}.
```

Figure 8:
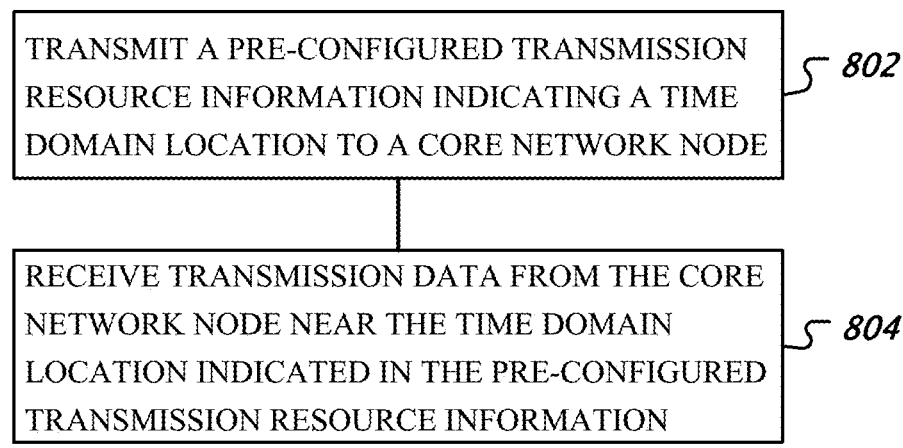
FIG. 8 shows an example of a wireless communication system where techniques in accordance with one or more embodiments of the present technology can be applied.

FIG. 8 is a flowchart illustrating a method for configuring pre-configured transmission resources. A communication node may transmit a pre-configured transmission resource information indicating a time domain location to a core network node (block 802). The communication node may be a eNB as described in any of example embodiments 1 to 6. The pre-configured transmission resource information may include a pre-configured uplink resource (PUR) as described in any of embodiments 1 to 6. The core network node may include MME as described in example embodiments 1 to 3.

The communication node may receive transmission data from the core network node near the time domain location indicated in the pre-configured transmission resource information (block 804). The time domain location (or preconfigured resource location) may be associated with a pre-configured transmission resource (or PUR). The pre-configured transmission resource configuration associated with a PUR may be transmitted to a terminal (or UE as described in example embodiments 1 to 6).

In some embodiments, the pre-configured transmission resource information is included within a terminal-specific dedicated message transmitted by the communication device to the core network node.

In some embodiments, the transmission data received at the communication device includes at least one of: a paging information, a paging information that includes user data, and user data with a non-access stratum (NAS) identifier of a terminal.

In some embodiments, the transmission data includes downlink data that is included within added to a paging message upon determining that the communication node has transmitted a pre-configured transmission resource configuration to a terminal.

In some embodiments, the method includes transmitting, by the communication device, the transmission data to a terminal using a dedicated Radio Network Temporary Identifier (RNTI).

In some embodiments, the method includes transmitting, by the communication device, a pre-configured transmission resource information reconfiguration message to the core network node, wherein the pre-configured transmission resource information release message includes a terminal-specific dedicated message and at least one of: a pre-configured transmission resource information indicating a time domain location and a non-access stratum (NAS) identifier of a terminal.

In some embodiments, the method includes transmitting, by the communication device, a pre-configured transmission resource information release message to the core network node, wherein the pre-configured transmission resource information release message includes a terminal-specific dedicated message.

In some embodiments, the pre-configured transmission resource information release message includes a terminal identifier, and wherein the pre-configured transmission resource information identifies a pre-configured uplink resource (PUR).

In an embodiment, a method for wireless communication comprises establishing, by a communication node, a terminal-specific connection with a core network node before or at a time domain location of the pre-configured transmission resource. The method also includes receiving, by the communication node, transmission data from the core network node.

In some embodiments, the method includes performing, by the communication node, downlink resource scheduling by using a downlink PDCCH search space included in the pre-configured transmission resource information and a dedicated radio network temporary identifier (RNTI), and transmitting, by the communication node, the transmission data to a terminal.

In some embodiments, the downlink data is transmitted from the core network node to the communication node via a terminal-specific connection.

In some embodiments, the method includes receiving, by the communication node, a paging message from the core network node based on determining that the communication node has not transmitted a pre-configured transmission resource configuration to a terminal; and transmitting, by the communication node, a response to the paging message to the core network node to establish a terminal-specific connection from the communication node to the core network node via the S1 interface, wherein the transmission data is received by the communication node upon establishing the connection.

In some embodiments, the method includes scheduling, by the communication node, a grant for a physical downlink shared channel (PDSCH) in the PDCCH common search space (CSS-Paging); and transmitting, by the communication node, a message using the PDSCH, wherein the message includes dedicated resource configuration information that includes at least one of a terminal-specific RNTI, an uplink (UL) grant resource (UL Grant), and a physical downlink control channel (PDCCH) search space.

In some embodiments, the method includes receiving, by the communication node, a message using a physical uplink shared channel (PUSCH) from a terminal over UL Grant based on the receipt of a message using PDSCH from the communication node.

In some embodiments, the method includes transmitting, by the communication node, a paging acknowledgement to the core network node based on receiving a message using a PUSCH from a terminal over UL Grant, wherein the paging acknowledgement indicates that transmission data transmission is complete.

In some embodiments, the method includes transmitting, by the communication node, a pre-configured transmission resource configuration message to a terminal to configure or reconfigure a pre-configured transmission resource for the terminal.

In some embodiments, the method includes receiving, by the communication node, a paging message from the core network node, wherein said connecting the communication node to the core network node is based on receiving the paging message.

In some embodiments, the method includes transmitting, by the communication node, a release message to the core network node based on determining that uplink and downlink data transmission is complete.

In an embodiment, a method for wireless communication comprises receiving, by a communication node, a paging message from a core network node within a predetermined time duration before the pre-configured transmission resource information. The method also includes forwarding, by the communication node, the paging message to the terminal, wherein the second paging message includes a time delay. The method also includes monitoring, by the communication node, transmission data over a pre-configured transmission resource from the terminal to establish a terminal-specific connection from the communication node to the core network node.

In some embodiments, the method includes determining, by the communication node, that the time delay is greater than a predetermined time duration or a pre-configured transmission resource PDCCH monitoring duration; transmitting, by the communication node, a connection message to the core network node to connect via a S1 interface; receiving, by the communication node, downlink data from the core network node over the S1 interface; performing, by the communication node, downlink resource scheduling by using a downlink PDCCH search space included in the pre-configured transmission resource information and a dedicated Radio Network Temporary Identifier (RNTI) within the time delay; and transmitting, by the communication node, the downlink data to the terminal.

In some embodiments, the method includes receiving, by the communication node, uplink data included in the preconfigured transmission resource information from the terminal; and transmitting, by the communication node, a terminal-specific S1 connection message to connect to the core network node via a terminal-specific S1 interface.

In some embodiments, the method includes determining, by the communication node, that the pre-configured transmission resource information received from the terminal does not include terminal uplink data, wherein the terminal is configured to not monitor a PDCCH search space associated with a pre-configured transmission resource based on determining that the pre-configured transmission resource information does not include terminal uplink data; and transmitting, by the communication node, a paging resource message to the terminal using common search space (CSS) for paging.

In some embodiments, the predetermined time duration is less than a paging retransmission timer, wherein the paging message does not include an extended discontinuous reception (eDRX) parameter.

In some embodiments, the paging message includes an eDRX parameter, wherein a predetermined time duration is less than a paging retransmission timer, wherein the communication node is configured to modify the predetermined time duration.

In an embodiment, a method for wireless communication comprising transmitting, by a communication device, a PDCCH common search space (CSS) transmission corresponding to a pre-configured transmission resource to a terminal, wherein a system information block (SIB) of the transmission includes a pre-configured transmission resource PDCCH common search space configuration information; and transmitting, by the communication device, a message including a pre-configured transmission resource CSS index to the terminal.

In some embodiments, the transmission includes a physical downlink control channel (PDCCH) search space and a first PDCCH common search space configuration associated with a first enhanced coverage level and a second PDCCH common search space configuration associated with a second enhanced coverage level.

In some embodiments, each of the first PDCCH common search space configuration and the second PDCCH common search space configuration includes at least one of a starting position of PDCCH monitoring, a parameter for determining the PDCCH monitoring starting position, a time interval for PDCCH monitoring, a parameter for determining the PDCCH monitoring time interval, and a maximum number of repetitions of the PDCCH.

In some embodiments, the method includes configuring the pre-configured transmission resource and the pre-configured transmission resource CSS index associated with the pre-configured transmission resource; and configuring a monitoring duration of the pre-configured transmission resource CSS during a radio resource control (RRC) connection state or a pre-configured transmission resource-based data transmission state.

In some embodiments, the method includes transmitting, by the communication device, a RRC connection release message in a RRC connection state or a pre-configured transmission resource-based data transmission state.

In an embodiment, a method for wireless communication comprises transmitting, by a communication node, a pre-configured transmission resource allocation transmission that includes a terminal-specific pre-configured transmission resource PDCCH search space configuration information to a terminal; receiving, by the communication node, a data transmission over a pre-configured transmission resource location at the time domain location for the pre-configured transmission resource PDCCH search space configuration information from the terminal; and scheduling, by the communication node, a terminal-specific PDCCH search space and a terminal-specific identifier within a timer or a predetermined time duration, wherein the terminal is configured to monitor the terminal-specific pre-configured transmission PDCCH search space within the timer or the predetermined time duration.

In some embodiments, the terminal-specific pre-configured transmission resource PDCCH search space configuration information includes at least one of: a maximum duration that terminal monitors the terminal-specific pre-configured transmission resource PDCCH search space, a timer that the terminal is configured to stop monitoring the terminal-specific pre-configured transmission resource PDCCH search space based on determining that there is no data transmission or reception, a terminal-specific Radio Network Temporary Identifier (RNTI) for the terminal-specific pre-configured transmission resource PDCCH search space, and the time domain location for the pre-configured transmission resource information.

In some embodiments, the terminal-specific pre-configured transmission resource PDCCH search space configuration information includes at least one of a start position of physical downlink control channel (PDCCH) monitoring, a parameter for determining the PDCCH monitoring start position, a time interval for PDCCH monitoring, a parameter for determining the PDCCH monitoring time interval, and a PDCCH, wherein the terminal-specific RNTI for the terminal-specific pre-configured transmission resource PDCCH search space is valid during the terminal monitoring the terminal-specific pre-configured transmission resource PDCCH search space or during the maximum duration that the terminal monitors the terminal-specific pre-configured transmission resource PDCCH search space, and wherein the maximum duration that UE monitors the terminal-specific pre-configured transmission resource PDCCH search space starts at the time domain location for the pre-configured transmission resource information or at the time that the terminal begins to monitor the terminal-specific pre-configured transmission resource PDCCH search space.

In some embodiments, the method includes determining, by the communication node, that a terminal uplink data is not transmitted over the pre-configured transmission resource location transmission from the terminal; and starting, by the communication node, the terminal-specific pre-configured transmission resource PDCCH search space timer based on receiving the pre-configured transmission resource location transmission from the terminal.

In some embodiments, the method includes transmitting, by the communication node, a message to the terminal to switch to a radio resource control (RRC) idle state upon the terminal-specific pre-configured transmission resource PDCCH search space timer expiring.

In some embodiments, the method includes transmitting, by the communication node, PDCCH scheduling information before the terminal-specific pre-configured transmission resource PDCCH search space timer expires, wherein the terminal is configured to perform data transmission and reception based on the PDCCH scheduling information; and resetting, by the communication node, the terminal-specific pre-configured transmission resource PDCCH search space timer.

In some embodiments, the method includes transmitting, by the communication node, a PDCCH acknowledgement message to the terminal based on determining that preconfigured transmission resource location transmission from the terminal includes uplink terminal data; starting, by the communication node, a terminal-specific pre-configured transmission resource PDCCH search space timer based on receiving the pre-configured transmission resource location transmission from the terminal; and transmitting, by the communication node, a message to the terminal to switch to a RRC idle state upon the terminal-specific pre-configured transmission resource PDCCH search space timer expiring.

In some embodiments, the method includes determining, by the communication node, that the pre-configured transmission resource location transmission from the terminal includes uplink terminal data; and transmitting, by the communication node, a RRC reconfiguration message to the terminal before a terminal-specific pre-configured transmission resource PDCCH search space timer expires based on determining that the pre-configured transmission resource location transmission from the terminal includes uplink terminal data, wherein the terminal is configured to turn into a RRC connected state upon receipt of the RRC reconfiguration message.

In some embodiments, the method includes determining, by the communication node, that the pre-configured transmission resource location transmission from the terminal includes uplink terminal data; transmitting, by the communication node, a PDCCH order to the terminal; receiving, by the communication node, a contention free random-access channel (CFRA) message from the terminal; transmitting, by the communication node, a PDCCH message over a terminal-specific pre-configured transmission resource PDCCH search space to the terminal, wherein a terminal-specific pre-configured transmission resource search PDCCH space timer starts upon transmission of the PDCCH message.

In some embodiments, the method includes determining, by the communication node, that the pre-configured transmission resource location transmission from the terminal includes uplink terminal data; transmitting, by the communication node, a PDCCH order to the terminal; receiving, by the communication node, a CFRA message from the terminal; and transmitting, by the communication node, a PDSCH message that includes a timing advance (TA) command medium access control (MAC) control element (CE) or a random-access response (RAR) message, wherein a terminal-specific pre-configured transmission resource PDCCH search space timer starts upon transmission of the PDSCH message.

In some embodiments, the method includes determining, by the communication node, that the pre-configured transmission resource location transmission from the terminal includes uplink terminal data; transmitting, by the communication node, a PDCCH order to the terminal; receiving, by the communication node, a contention free random-access (CFRA) message from the terminal; transmitting, by the communication node, a PDSCH message that includes a TA command and a MAC CE, wherein a terminal-specific pre-configured transmission resource PDCCH search space timer starts upon transmission of the PDSCH message; receiving, by the communication node, a PUSCH message that includes a C-RNTI MAC CE, wherein a terminal-specific pre-configured transmission resource search PDCCH space timer starts upon reception of the PUSCH message.

In some embodiments, the pre-configured transmission resource allocation transmission includes a traffic pattern corresponding to a pre-configured transmission resource.

In some embodiments, the traffic pattern includes at least one of a pre-configured transmission resource transmission start time, a periodic pre-configured transmission resource transmission interval, a maximum effective duration of a periodic pre-configured transmission resource or an effective timer, and superposition information of a plurality of service modes.

In some embodiments, the traffic pattern is expressed by an absolute pre-configured transmission resource transmission start time.

In some embodiments, wherein the traffic pattern is expressed by an offset value relative to an absolute time.

Figure 9:
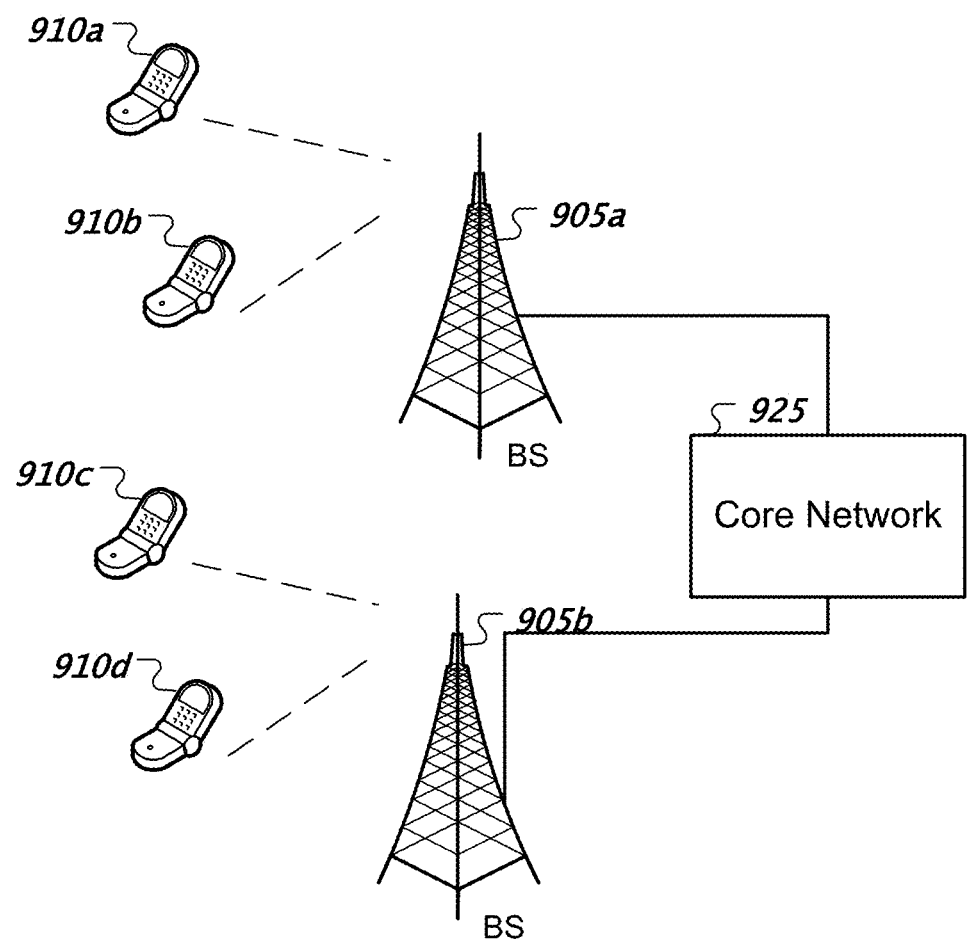
FIG. 9 is a block diagram representation of a portion of a hardware platform.

FIG. 9 shows an example of a wireless communication system where techniques in accordance with one or more embodiments of the present technology can be applied. A wireless communication system 900 can include one or more base stations (BSs) 905*a*, 905*b*, one or more wireless devices 910*a*, 910*b*, 910*c*, 910*d*, and a core network 925. A base station 905*a*, 905*b* can provide wireless service to wireless devices 910*a*, 910*b*, 910*c* and 910*d* in one or more wireless sectors. In some implementations, a base station 905*a*, 905*b* includes directional antennas to produce two or more directional beams to provide wireless coverage in different sectors.

The core network 925 can communicate with one or more base stations 905*a*, 905*b*. The core network 925 provides connectivity with other wireless communication systems and wired communication systems. The core network may include one or more service subscription databases to store information related to the subscribed wireless devices 910*a*, 910*b*, 910*c*, and 910*d*. A first base station 905*a* can provide wireless service based on a first radio access technology, whereas a second base station 905*b* can provide wireless service based on a second radio access technology. The base stations 905*a* and 905*b* may be co-located or may be separately installed in the field according to the deployment scenario. The wireless devices 910*a*, 910*b*, 910*c*, and 910*d* can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 10:
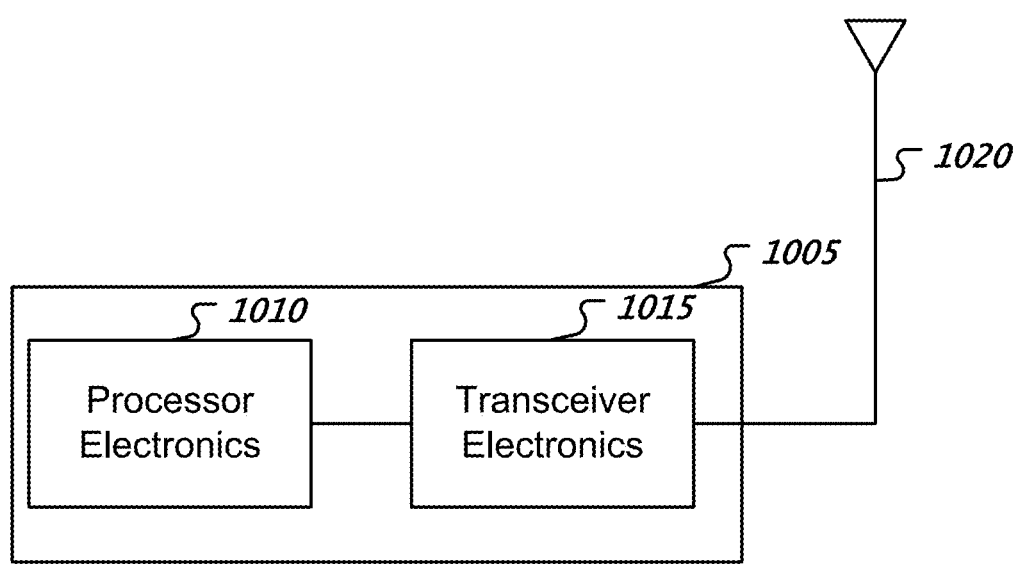
FIG. 10 is a block diagram representation of a portion of a hardware platform.

FIG. 10 is a block diagram representation of a portion of a hardware platform. A hardware platform 1005 such as a network device or a base station or a wireless device (or UE) can include processor electronics 1010 such as a microprocessor that implements one or more of the techniques presented in this document. The hardware platform 1005 can include transceiver electronics 1015 to send and/or receive wired or wireless signals over one or more communication interfaces such as antenna 1020 or a wireline interface. The hardware platform 1005 can implement other communication interfaces with defined protocols for transmitting and receiving data. The hardware platform 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions are implemented using the hardware platform 1005.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
causing, by a communication node, a terminal to transition from a radio resource control connection status to a radio resource control idle state;
transmitting, by the communication node, to a core network node, a terminal-specific dedicated message including a pre-configured transmission resource information indicating a time domain location of a dedicated resource for transmission in the radio resource control idle state; and
receiving, by the communication node, transmission data from the core network node at the time domain location indicated in the pre-configured transmission resource information.

2. The method of claim 1, wherein the transmission data received at the communication node includes at least one of: a paging information, a paging information that includes user data, and user data with a non-access stratum (NAS) identifier of the terminal.

3. The method of claim 1, further comprising:
transmitting, by the communication node, the transmission data to the terminal using a dedicated radio network temporary identifier (RNTI).

4. The method of claim 1, further comprising:
transmitting, by the communication node, a pre-configured transmission resource information release message to the core network node, wherein the pre-configured transmission resource information release message includes a terminal identifier.

5. The method of claim 1, wherein the pre-configured transmission resource information identifies a pre-configured uplink resource (PUR).

6. The method of claim 1, further comprising:
establishing, by the communication node, a terminal-specific connection with the core network node before or at a time domain location based on the pre-configured transmission resource information.

7. The method of claim 6, further comprising:
performing, by the communication node, downlink resource scheduling by using a downlink physical downlink control channel (PDCCH) search space included in the pre-configured transmission resource information and a dedicated radio network temporary identifier (RNTI).

8. The method of claim 6, further comprising:
receiving, by the communication node, a paging message from the core network node based on determining that the communication node has not transmitted a pre-configured transmission resource configuration to the terminal;
transmitting, by the communication node, a response to the paging message to the core network node to establish a terminal-specific connection from the communication node to the core network node, wherein the transmission data is received by the communication node upon establishing the connection.

9. A method for wireless communication, comprising:
causing, by a communication node, a terminal to transition from a radio resource control connection status to a radio resource control idle state;
receiving, by the communication node, a paging message from a core network node within a predetermined time duration before receiving pre-configured transmission resource information indicating a dedicated resource for transmission in the radio resource control idle state;
forwarding, by the communication node, the paging message to the terminal, wherein the paging message includes a time delay; and
monitoring, by the communication node, transmission data over a pre-configured transmission resource from the terminal to establish a terminal-specific connection from the communication node to the core network node.

10. The method of claim 9, further comprising:
determining, by the communication node, that the time delay is greater than a predetermined time duration or a pre-configured transmission resource downlink physical downlink control channel (PDCCH) monitoring duration;
transmitting, by the communication node, a connection message to the core network node to connect via a S1 interface;
receiving, by the communication node, downlink data from the core network node over the S1 interface;
performing, by the communication node, downlink resource scheduling by using a downlink PDCCH search space included in the pre-configured transmission resource information and a dedicated radio network temporary identifier (RNTI) within the time delay; and
transmitting, by the communication node, the downlink data to the terminal.

11. The method of claim 9, further comprising:
receiving, by the communication node, uplink data included in the pre-configured transmission resource information from the terminal; and
transmitting, by the communication node, a terminal-specific S1 connection message to connect to the core network node via a terminal-specific S1 interface.

12. The method of claim 9, wherein the paging message includes a paging eDRX parameter, wherein a predetermined time duration is less than a paging retransmission timer and is less than a paging time window (PTW) length, wherein the paging retransmission timer is defined by the communication node and/or transmitted by the core network node, wherein the communication node is configured to define and/or modify the predetermined time duration.

13. A method for wireless communication, comprising:
causing, by a communication node, a terminal to transition from a radio resource control connection status to a radio resource control idle state;
transmitting, by the communication node, to the terminal, a pre-configured transmission resource allocation transmission that includes a terminal-specific pre-configured transmission resource physical downlink control channel (PDCCH) search space configuration information and a pre-configured dedicated resource for transmission in the radio resource control idle state;
receiving, by the communication node, from the terminal, a data transmission over a pre-configured transmission resource location;
transmitting, by the communication node, a PDCCH associated with a terminal-specific identifier within a timer or a predetermined time duration, wherein the terminal is configured to monitor the terminal-specific pre-configured transmission PDCCH search space within the timer or the predetermined time duration.

14. The method of claim 13, wherein the pre-configured dedicated resource includes at least one of: a maximum duration that terminal monitors the terminal-specific pre-configured transmission resource PDCCH search space, a timer that the terminal is configured to stop monitoring the terminal-specific pre-configured transmission resource PDCCH search space based on determining that there is no data transmission or reception, a terminal-specific Radio Network Temporary Identifier (RNTI) for the terminal-specific pre-configured transmission resource PDCCH search space, a time domain location for the pre-configured dedicated resource, and an uplink grant for the pre-configured dedicated resource.

15. The method of claim 13, further comprising:
determining, by the communication node, that a terminal uplink data is not transmitted over a pre-configured transmission resource location transmission from the terminal; and
starting, by the communication node, a terminal-specific pre-configured transmission resource PDCCH search space timer based on receiving the pre-configured transmission resource location transmission from the terminal.

16. The method of claim 13, further comprising:
transmitting, by the communication node, a PDCCH acknowledgement message to the terminal based on determining that a pre-configured transmission resource location transmission from the terminal includes uplink terminal data;
starting, by the communication node, a terminal-specific pre-configured transmission resource PDCCH search space timer based on receiving the pre-configured transmission resource location transmission from the terminal; and transmitting, by the communication node, a message to the terminal to switch to a RRC idle state upon the terminal-specific pre-configured transmission resource PDCCH search space timer expiring.

17. The method of claim 13, further comprising:

determining, by the communication node, that a pre-configured transmission resource location transmission from the terminal includes uplink terminal data; and transmitting, by the communication node, a RRC reconfiguration message to the terminal before a terminal-specific pre-configured transmission resource PDCCH search space timer expires based on determining that the pre-configured transmission resource location transmission from the terminal includes uplink terminal data, wherein the terminal is configured to turn into a RRC connected state upon receipt of the RRC reconfiguration message.

18. The method of claim 13, further comprising:

determining, by the communication node, that a pre-configured transmission resource location transmission from the terminal includes uplink terminal data;

transmitting, by the communication node, a PDCCH order to the terminal;

receiving, by the communication node, a contention free random-access channel (CFRA) message or a CFRA message from the terminal;

transmitting, by the communication node, a PDCCH message over a terminal-specific pre-configured transmission resource PDCCH search space to the terminal, wherein a terminal-specific pre-configured transmission resource PDCCH search space timer starts upon transmission of the PDCCH message, or a PDSCH message that includes a timing advance (TA) command medium access control (MAC) control element (CE) or a random-access response (RAR) message, wherein a terminal-specific pre-configured transmission resource PDCCH search space timer starts upon transmission of the PDSCH message.

19. The method of claim 13, further comprising:

determining, by the communication node, that a pre-configured transmission resource location transmission from the terminal includes uplink terminal data;

transmitting, by the communication node, a PDCCH order to the terminal;

receiving, by the communication node, a contention free random-access (CFRA) message from the terminal;

transmitting, by the communication node, a PDSCH message that includes a TA command and a MAC CE, wherein a terminal-specific pre-configured transmission resource PDCCH search space timer starts upon transmission of the PDSCH message; and receiving, by the communication node, a PUSCH message that includes a C-RNTI MAC CE, wherein a terminal-specific pre-configured transmission resource PDCCH search space timer starts upon reception of the PUSCH message.

20. The method of claim 13, wherein the pre-configured transmission resource allocation transmission includes a traffic pattern corresponding to a pre-configured transmission resource.

* * * * *